United States Patent [19]

Elberbaum

[11] Patent Number: 5,592,321
[45] Date of Patent: Jan. 7, 1997

[54] APPARATUS FOR SELECTIVE ROUTING OF INFORMATION SIGNALS

[75] Inventor: David Elberbaum, Tokyo, Japan

[73] Assignee: Elbex Video, Ltd., Tokyo, Japan

[21] Appl. No.: 421,615

[22] Filed: Apr. 13, 1995

[51] Int. Cl.⁶ .................................................. H04B 10/12
[52] U.S. Cl. .......................... 359/173; 359/109; 348/385; 348/335
[58] Field of Search ..................................... 359/109, 117, 359/154, 159, 163, 173; 345/1–2; 348/15, 385, 388, 705–706, 722, 359, 218, 335

[56] References Cited

U.S. PATENT DOCUMENTS

| | | | |
|---|---|---|---|
| 4,383,170 | 5/1983 | Takagi et al. | 348/335 |
| 4,603,352 | 7/1986 | Kaneta et al. | 348/518 |
| 4,863,233 | 9/1989 | Nienaber et al. | 359/154 |
| 4,943,864 | 7/1990 | Elberbaum | 348/706 |
| 5,448,661 | 9/1995 | Takai et al. | 359/154 |

*Primary Examiner*—Leo Boudreau
*Assistant Examiner*—Kinfe-Michael Negash
*Attorney, Agent, or Firm*—Helfgott & Karas, P.C.

[57] ABSTRACT

An apparatus for the selective routing of information signals includes a plurality of transmitting units. Each transmitting unit has a transmitter for transmitting information by converting the same into a light signal. A plurality of fiber optic lines are provided for carrying the light signal from the transmitting units. Each fiber optic line corresponds to one of the transmitting units. At least one receiving unit is provided for selectively receiving the information carried by the fiber optic lines. The receiving unit includes a liquid crystal panel having a plurality of light passing areas. The optical transmission properties of the light passing areas are controlled individually, for selectively receiving the light from the fiber optic lines, for effecting connections between the transmission units and the receiving unit by the fiber optic lines in any arbitrary combination. Each light passing area corresponds to one of the fiber optic lines. A receiver which is part of the receiving unit generates an electrical signal converted from the light which passes through the liquid crystal panel.

118 Claims, 13 Drawing Sheets

APPARATUS FOR SELECTIVE ROUTING OF INFORMATION SIGNALS

BACKGROUND OF THE INVENTION

1. Field of the Invention

This invention relates to an apparatus for the selective routing of information signals, and more particularly, to an apparatus including one or more receiving apparatuses for selectively receiving information from a plurality of transmitting apparatuses.

2. Description of the Prior Art

An information transmission system such as monitoring television system uses an electronic switch or an electronic matrix switch as an information signal selecting apparatus for selectively connecting one or more television cameras to one or more television monitors.

An electronic switch or electronic matrix switch are also used for connecting sequentially a plurality of television cameras to a television monitor or a video recorder through a sequential switch-over operation in order to display sequencing images from the plurality of the television cameras on the television monitor or to successively record the images on the video recorder.

However, in a well known electronic switch or matrix switching used for a system of this kind, as the number of television cameras and monitors or video recorders increase, it increases the cross talk between the different information signals as well as increasing the centralized switching and coordination complexity, requiring larger software and hardware capacity to control the multiple individual independent outputs. Thereby, as the system grows, the information signals become corrupted with cross talk and the matrix switching control becomes costly and inefficient.

Further, well known electronic switches or an electronic matrix switches do not employ synchronized switching and the selected images displayed on a monitor are often disturbed during and immediately after the switching-over from one television camera to another.

In such an information switching system it is preferable to mutually lock the internal synchronizing signals of a plurality of television cameras and the electronic switching time to an external synchronizing signal, in order to prevent the picture image on the monitor from being disturbed during and immediately after the switching operation from one television camera to another.

As the one of the devices for synchronizing a plurality of television cameras, there are known apparatus for transmitting vertical synchronizing signal and a horizontal synchronizing signal or composite synchronizing signal used in a television system. Another known apparatus for transmitting a vertical drive signal and a horizontal drive signal, and driving the television camera and its deflection circuits by the transmitted vertical drive signal, and the horizontal drive signal.

In any of the above known methods and devices of the type under discussion, as the transmitted synchronizing signal itself is a train of pulses, which can be easily influenced by noise, the transmission of a synchronizing signal requires the use of a coaxial cable with its high shielding effect, which makes it costly for systems with plurality of television cameras.

Another known apparatus for synchronizing a plurality of television cameras, is an apparatus for transmitting an external synchronizing signal from an external synchronizing generator to the television cameras by injecting the external synchronizing signal into the video signal transmission line and locking an internal synchronizing signal generator of the television camera by means of the transmitted external synchronizing signal. Such an apparatus is disclosed in U.S. Pat. No. 4,603,352 the contents of which are incorporated herein by reference.

SUMMARY OF THE INVENTION

An object of the present invention is to eliminate the well known electronic switches or the electronic matrix switches from the selection and the switch over operations and to make it simple and easy to control the selection independently from any of the receiving means by providing each receiving means with individual controller. Another object of present invention is to provide smooth synchronized switching over from one transmitting means to another without any disturbance to the reproduced images, even though a large number of transmitting means and receiving means are involved.

An apparatus for selective routing of information signals according to the present invention comprises a plurality of transmitting means each having a transmitter for transmitting information by converting the same into light signals, a plurality of fiber optic lines for carrying the light signals from the transmitting means, each fiber optic line corresponding to one of the transmitting means, and at least one receiving means for selectively receiving the information light signals carried through the fiber optic lines. The receiving means includes a liquid crystal panel having a plurality of light passing areas and wherein each light passing area is individually controlled for receiving light from the corresponding fiber optic line and a receiving circuit for generating an electrical signal upon receiving light signal which passes through the liquid crystal panel.

The information from each transmitting means transmitted to the receiving means through the fiber optic lines is selected or switched-over at the receiving means by a selecting means for selectively switching-on a light passing area of the liquid crystal panel, to clear the passage of light (on-state), while blocking other areas of the liquid crystal to the passage of light (off-state).

According to the present invention, even though a large number of transmitting apparatuses and receiving apparatuses may be connected together, the apparatus for selecting or switching-over the transmitting apparatus to the receiver is simplified.

Each transmitter includes a photoemissive element for emitting light signals and a driver for feeding the photoemissive element with the information signal. The receiving circuit includes a light receiving element for receiving the light signal which passes through the liquid crystal panel and a converter for generating an electrical signal corresponding to the information of the light signal received by the light receiving element.

Each transmitting means further includes a lens for directing the light emitted by the photoemissive element toward the optical fiber lines. The receiving means further includes a lens for directing the light which passes through the liquid crystal panel toward the receiving element.

The apparatus of the present invention further comprises a plurality of video signal generating means, such as television cameras, respectively connected to the plurality of transmitting means for feeding a video signal, as one of the information signals, to the corresponding transmitting means. Each video signal generating means includes an internal synchronizing signal generation circuit for generating an internal synchronizing signal synchronized with the external synchronizing signal, and a monitor for reproducing an image corresponding to the video signal or a video recorder for recording the video signal fed from the receiver.

The switching-over from one area of the liquid crystal panel to another for switching-over the light passing signals from one transmitting means to another is timed by an external synchronizing signal to occur precisely along with the vertical synchronizing timing, thereby, providing an uninterrupted synchronizing process and the reproduced video images on the monitor or the recorded video signals onto the video recorders are not disturbed, during and immediately after the switch-on or switch-over operation.

According to the present invention, each receiving means is connected to a plurality of transmitting means through a plurality of corresponding fiber optic lines and liquid crystal panel and the switch-over timing of the selected areas of liquid crystal panels in the plurality of receiving means is synchronized with the external synchronizing signal. Therefore, even though a large number of transmitting means and receiving means are involved, any of the information transmitted to the receiving means can be synchronously switched-on or switched-over by a simple apparatus without disturbing the reproduced video images.

The apparatus of the present invention further comprises an external synchronizing signal generating means for generating and feeding an external synchronizing signal to the video signal generating means through the transmitting means and to the receiving means. The external synchronizing signal is a pulse signal having a voltage level higher than the maximum voltage level or lower than the minimum voltage level of the video signal. Each transmitting means includes a circuit for injecting the external synchronizing signal into a transmission line connected to the video signal generating means. Each video signal generating means further includes a level comparator circuit for extracting the external synchronizing signal by comparing the signal level of the external synchronizing pulse signal with a reference signal having a predetermined voltage and feeds the extracted external synchronizing signal to the internal synchronizing signal generation circuit. Since the external synchronizing pulse is generated during the vertical blanking period of the video signal, the external synchronizing signal can be transmitted commonly through the same transmission line used for transmitting the video signal without affecting the video signal.

Each transmitting means preferably further includes a circuit for removing the external synchronizing signal from the output signal fed through the corresponding photoemissive elements feeding the fiber optic lines to the receiving means. Thereby, since the external synchronizing signal can be removed from the video signal transmitted through the fiber optic lines, the external synchronizing signal does not influence the receiving circuit of the receiving means and the video signal can be flawlessly received.

Each video signal generating means further includes an identification code generation circuit for generating an identification code signal corresponding to an identification number, respectively allotted to each video signal generating means, for injecting the identification code signal into a video signal fed to the transmitting means. At least one receiving means further includes an identification code signal processing means for extracting the identification code signal from the output signal of the receiving circuit and for feeding a signal corresponding to the extracted identification code signal to the video signal processing means.

The identification code signal processing means preferably includes a memory for storing identification data for each allotted code number, an extraction circuit for extracting the identification code signal from the output signal of the receiving circuit and to generate a decoded signal by decoding the extracted identification code signal, and a superimpose circuit for retrieving the identification data of the decoded signal from the memory and for superimposing the retrieved identification data onto the video signal. Thereby, the processed video signal can be identified by the identification code signal processing means for verification of the video generating means which is transmitting the video signal, thereby, providing the basis for error free controlling of the video generating means.

Each transmitting means preferably further includes a signal mixing means for generating a mixed signal composed of a video signal and an audio signal by injecting the audio signal into the video signal for feeding the mixed signal to a plurality of corresponding fiber optic lines. Thereby, both the mixed video signal and the audio signal can be transmitted between the transmitting means and the receiving means through a common fiber optic line.

Each video signal generating means preferably further includes a signal mixing means for generating a mixed signal composed of a video signal and an audio signal by injecting the audio signal into the video signal for feeding the mixed signal to the corresponding transmitting means. Thereby, both the video signal and the audio signal can be transmitted between the video signal generating means and the transmitting means through a common transmission line.

Each receiving means further includes an audio signal retrieving means for outputting an audio signal by retrieving the audio from the mixed signal.

The apparatus of the present invention further comprises a control means for generating a control signal consisting of a coded control command combined with the identification code signal which is decoded by and fed from the extraction circuit, for controlling the video signal generating means, such as controlling the panning or the fitting positions of the video signal generating means. The coded control command is fed to the video signal generating means for operating, such as, the panning or the tilting of the video signal generating means only when the identification code signal, combined into the control signal, corresponds to the identification number allotted to the video signal generating means being controlled. Thereby, only a specific video signal generating means, having its identification code extracted and decoded by the extraction circuit of the control means during the controlling process, can have its allotted identification number coincide with the identification code extracted from the control signal fed from the control means. Therefore, any specific video signal generating means can be verifiable and accurately controlled.

The control signal is injected into a video transmission line connecting the video signal generating means to the transmitting means during the vertical blanking period of the video signal, and the video signal generating means preferably further includes a control signal processing means for extracting the control signal from the video transmission line and for feeding the extracted control signal to a circuit such as a circuit for controlling the panning or the tilting of the video signal generating means only when the identification code signal, which is combined into the control signal, corresponds to the identification code allotted to it. Since the control signals are transmitted during the blanking period of the video signal it can be transmitted to the video signal generating means from the transmitting means through a common transmission line without disturbing the video signal.

Each receiving means further includes a driver and a photoemissive element for receiving the control signal together with the identification code signals generated by the control means for converting the control signals into light signal and for feeding the converted control light signals to the transmitting means through the fiber optic lines.

Each transmitting means further includes a light receiving element for converting the received control light signal carried through the fiber optic lines into an electrical signal and for injecting the converted electrical signal into the transmission line connecting the transmitting means to the video generating means.

Each transmitting means preferably further includes a control signal extractor for extracting the control signal from the converted control signal fed through the fiber optic lines, for feeding the extracted control signal to the corresponding video signal generating means. Thereby, both the video signal and the control signal can be transmitted between the receiving means and the video signal generating means through the transmitting means and through a common transmission line.

Each transmitting means can feed the control signal to the video signal generating means by injecting the control signal into the video transmission line connecting the transmitting means to the video signal generating means or through a separate control transmission line.

The apparatus of the present invention further comprises an individual selecting means included in each receiving means for individually controlling the selection circuits, and may further comprise a master controller for supervising or coordinating the controlling state of all the control means in order to prevent any conflicting or prohibited selection.

The apparatus of the present invention further comprises an individual control means in each receiving means for individually controlling the video signal generating means through the fiber optic lines, and may further comprise a master controller for supervising the controlling state of all the control means in order to prevent any conflicting, prohibited or error control command.

In addition, the master control unit can override and control each of the control circuits of the receiving means and each of the video signal generating means connected to the plurality of transmission lines.

BRIEF DESCRIPTION OF THE DRAWINGS

The foregoing objects and features of the present invention will become apparent from the following description of preferred embodiments of the invention with reference to the accompanying drawings, in which.

DETAILED DESCRIPTION OF PREFERRED EMBODIMENTS

Figure 1:
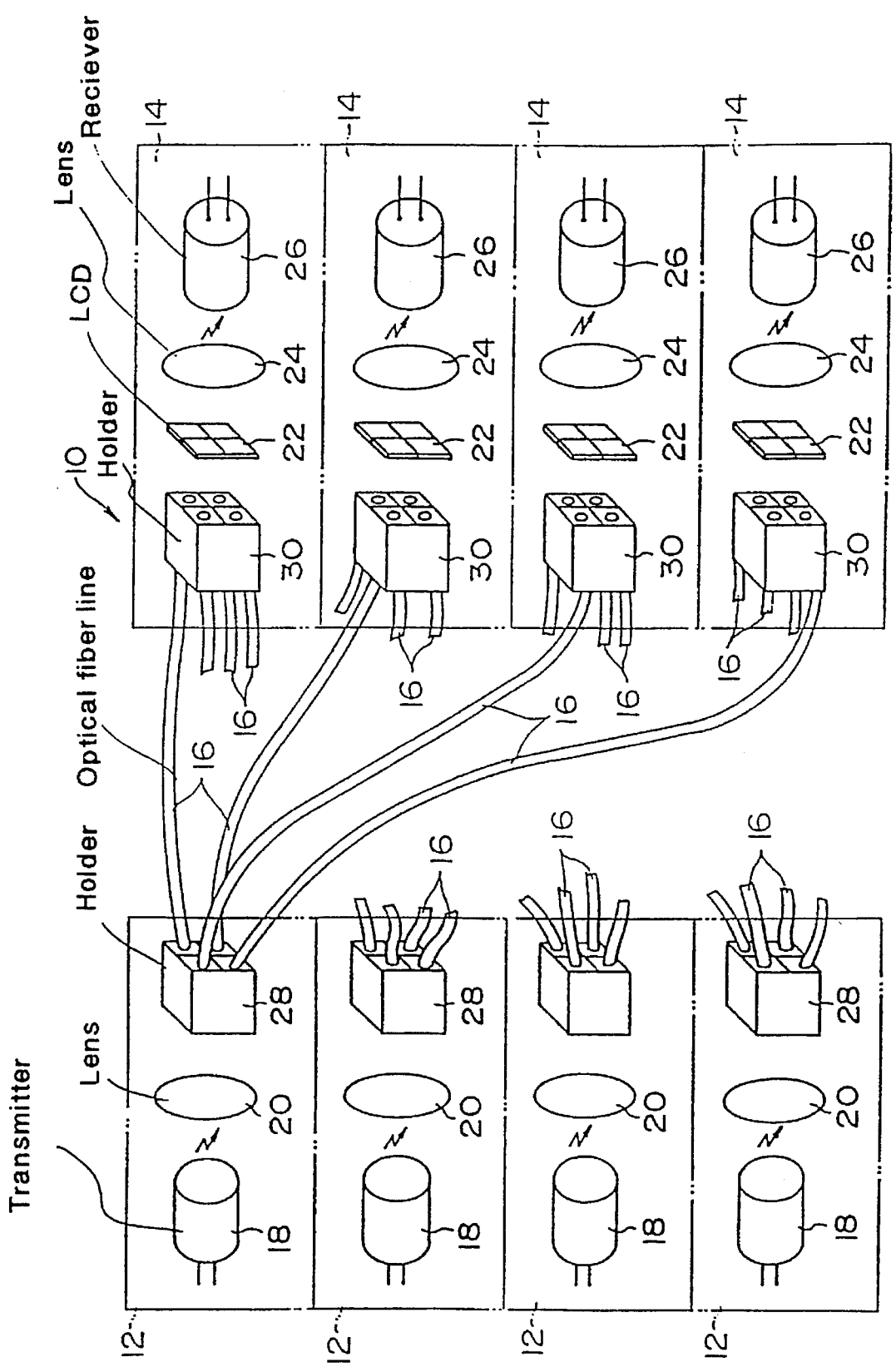
FIG. 1 is an exploded view showing an apparatus for the selective routing of information signals in accordance with a preferred embodiment of the present invention.

FIG. 1 shows an information signal routing apparatus 10 for selectively routing of information signals comprises a plurality of transmitting apparatuses 12 for transmitting information by converting the same into light signal; a plurality of receiving apparatuses 14 for converting the light signal into electrical signal: and a plurality of fiber optic lines 16 for carrying the light signals.

Each transmitting apparatus 12 is connected to each of the receiving apparatuses 14 through the fiber optic lines 16 extending from the transmitting apparatuses 12 to the receiving apparatuses 14.

Each fiber optic line 16 corresponds to a combination of the transmitting apparatus 12 and the receiving apparatus 14. Therefore, each transmitting apparatus 12 is connected to all the receiving apparatuses 14 through the plurality of fiber optic lines 16 extending from the transmitting apparatus 12, while each receiving apparatus 14 is connected to all the transmitting apparatuses 12 through the plurality of fiber optic lines 16 extending from the receiving apparatus. Thus, the number of arranged fiber optic lines 16 corresponds to the product of the number of transmitting apparatus 12 and the number of receiving apparatuses 14.

In the illustrated embodiment, there are provided as many transmitting apparatuses 12 as there are receiving apparatuses 14. These numbers may differ so that a plurality of transmitting apparatuses 12 and at least one receiving apparatus 14 can be arranged.

Each transmitting apparatus 12 includes a transmitter 18 for converting information signal into light signal, and a lens 20 for directing the light signal generated by the transmitter to the fiber optic lines 16. Each receiving apparatus 14 includes a liquid crystal panel 22 allowing the passage of light from the fiber optic lines 16, a lens 24 for directing the light passing through the liquid crystal panel to a receiver 26 for converting the light signal back into an electrical signal.

Each transmitter 18 includes a photoemissive element such as a light emitting diode, and a driver for driving the photoemissive element by the information signal. Each receiver 26 includes light receiving element such as a photo transistor for generating an electrical signal corresponding to a level of light reaching the light receiving element.

The lens 20 of each transmitting apparatus 12 is positioned in a way to direct the light signal generated by photoemissive element to all the ends of the fiber optic lines 16 which are grouped, united or joint together by a bracket 28 or by other means, such as molded together. The ends of the fiber optic lines 16 on the side of each receiving apparatus 14 are grouped, united or joint together by a bracket 30 or by other means, such as molded together, respectively directing the light signal to the receiver 26 through the liquid crystal panel 22 and lens 24.

Each liquid crystal panel 22 is a well known liquid crystal panel for controlling the light passing characteristics according to an electro optical effect caused by applying an electric field on the liquid crystal. Each liquid crystal panel 22 has light passing areas which may be as many as or more than the number of fiber optic lines 16 extending from the corresponding receiving apparatus 14. That is, as many as or more than the number of transmitting apparatuses connected to the receiving apparatus.

In the illustrated embodiment, each liquid crystal panel 22 has four light passing areas individually corresponding to the fiber optic lines 16 extending from the corresponding receiving apparatus 14. Each light passing area is selectively controlled by a controller to switch the light passing area to an on-state for clearing the passage of light or to an off-state for blocking the passage of light. The liquid crystal panel 22 is arranged between the ends of the fiber optic lines or bracket 30 and the lens 24, aligned to correspond the fiber optic line ends with the light passing areas of the liquid crystal panel and for directing the passing light signal to the receiver 26 through the lens 24.

The information signal to be routed is generated from an information generating apparatus (not shown) such as a television camera connected respectively to each transmitting apparatus or an information signal generating apparatus (not shown) commonly connected to a plurality of transmitting apparatuses.

The information signal is converted into a light signal by the transmitter 18 of the transmitter apparatus 12, and the converted light signal is fed to the receiving apparatus 14 through the lens 20 and the fiber optic lines 16.

Only a predetermined light passing area of the liquid crystal panel of each receiving apparatus 14 is switched to an on-state, while all the other light passing areas are switched to an off-state. Thereby, since only a light signal from the fiber optic line 16 corresponding to the light passing area in the on-state is directed to the receiver 26 through the lens 24, only the light signal generated by the transmitting apparatus 12 corresponding to the light passing area switched to on-state is converted into an electrical signal by the receiver 26. The converted electrical signal is fed to a signal processing apparatus (not shown) such as a television receiver and/or a video recorder.

Since only the light passing area of the liquid crystal panel 22 corresponding to a selected transmitting apparatus is switched on to pass the selected light signal to the receiver 26, while other areas of the liquid crystal panel 22 are switched off, cutting or blocking all other signals, thereby the light signal received by the receiver 26 is switched-over to the signal generated by the selected transmitting apparatus. It has been well known that in a liquid crystal display panel each light passing area is selectively controlled to be in the on-state and off-state by applying an electric field to each light passing area.

The apparatus 10 for the selective routing of information signals can connect the transmitting apparatuses 12 and the receiving apparatuses 14 together in any arbitrary combination with each other, such as connecting several fiber optic lines extending from same transmitting apparatus 12 to same receiving apparatus 14, or it can connect one transmitting apparatus 12 to a plurality of arbitrarily chosen receiving apparatuses 14. Any such arbitrary combination can be operated by properly selecting the light passing areas of the liquid crystal panels 22 of the corresponding arbitrary connected fiber optic lines through a control means (not shown).

Figure 2:
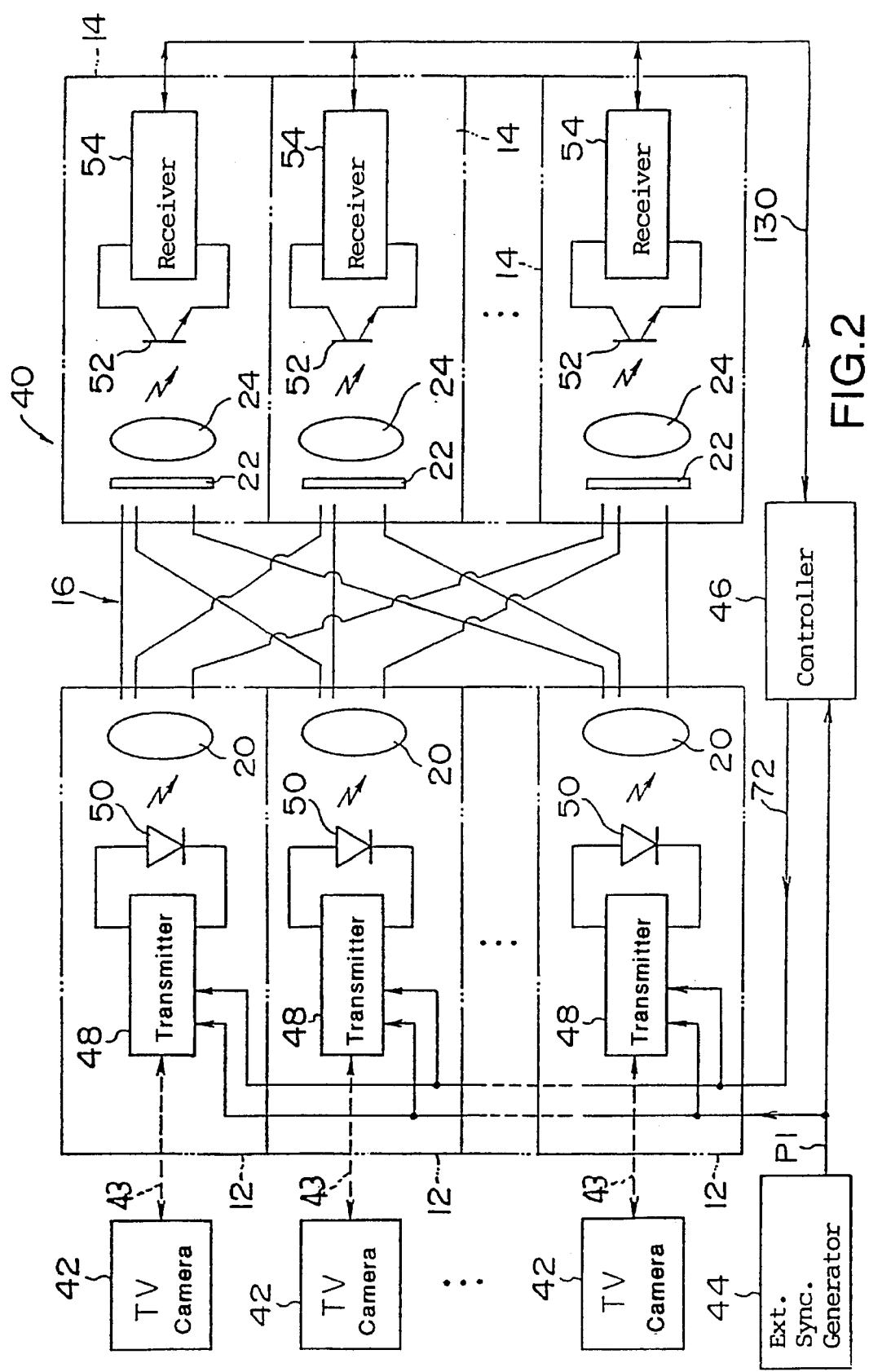
FIG. 2 is a block diagram showing an apparatus for the selective routing of information signals in accordance with another preferred embodiment of the present invention.

FIG. 2 shows an embodiment of an apparatus 40 for the selective routing of information signals wherein the apparatus incorporating the principles of the present invention is used in a closed circuit television system such as a monitoring system.

The apparatus 40 for selective routing of information signals comprises, in addition to a plurality of transmitting apparatuses 12, a plurality of receiving apparatuses 14 and a plurality of fiber optic lines 16, a video signal generating apparatus, such as television cameras 42 respectively connected to each transmitting apparatus 12, an external synchronizing signal generator 44 for synchronizing the television cameras 42, and a control circuit 46 for feeding a control command to the transmitting apparatuses 12 and to the receiving apparatuses 14.

The transmitting apparatuses 12, the receiving apparatuses 14, the fiber optic lines 16, the external synchronizing signal generator 44 and the control circuit 46 may be situated in a monitoring room. On the other hand, each television camera 42 is respectively situated in a location to be monitored. The transmitting apparatus 12 and the television cameras 42 respectively corresponding to each other are connected through a transmission line 58 such as a coaxial cable. The transmission line 58 corresponds to a transmission line 58, or to a combination of transmission lines 58, 66, 82 and 89 in an embodiment which will be described later.

A video signal generated by each television camera 42 is a composite video signal. The frequency of an external synchronizing signal P1 is related to the vertical frequency of the video signal generated by the television camera 42, preferably having frame or a field scanning frequency. For instance, in the case of NTSC system, the frame frequency is 30 Hz and the field frequency is 60 Hz. In such case, the frequency of the external synchronizing pulse P1 can be either frame frequency of 30 Hz or a field frequency of 60 Hz.

Figures 3A, 3B, 3C:
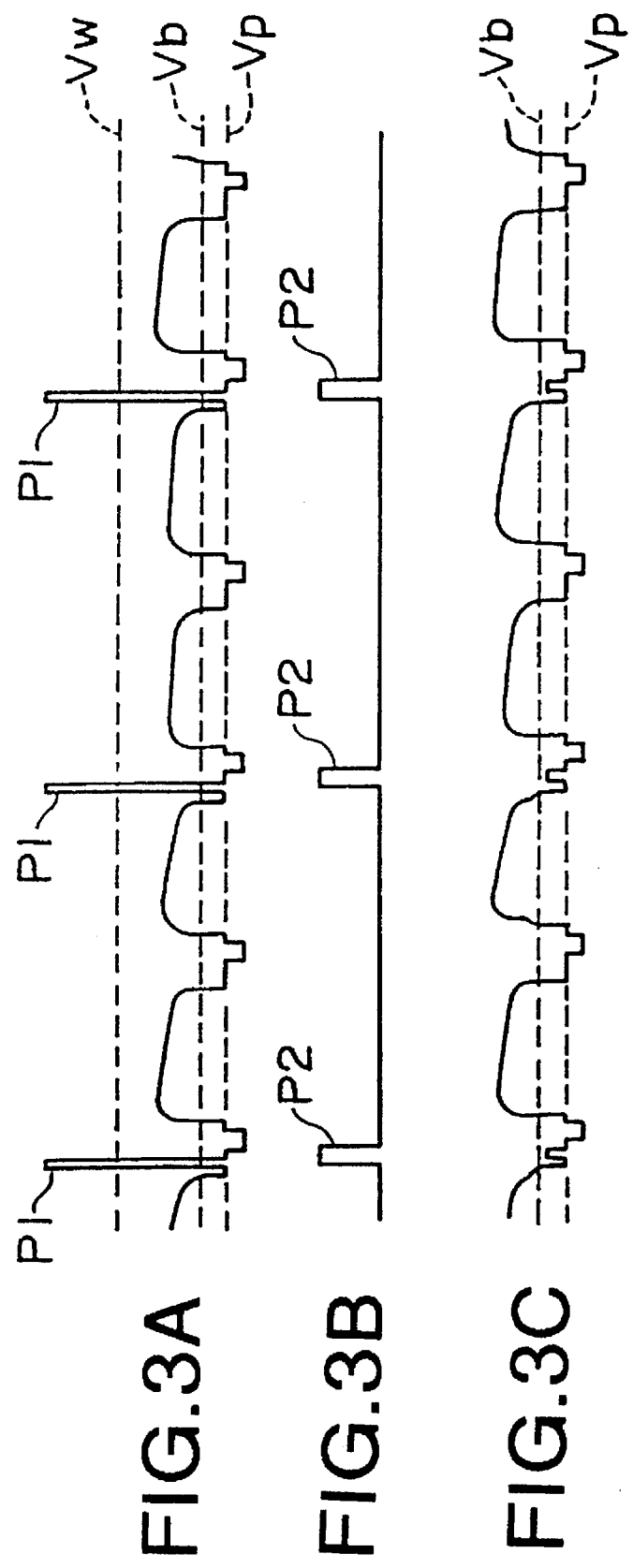
FIGS. 3A, 3B and 3C show waveforms of signals transmitted by the apparatus shown in FIG. 2.

As shown in FIGS. 3A–3C, the time the external synchronizing signal P1 is generated is adjoining the vertical synchronizing pulse, occurring during the vertical blanking period of the video signal transmitted from the television camera 42. Thereby, the external synchronizing signal P1 can be propagated to the television camera 42 through the common transmission line 58 transmitting the video signal without affecting the video signal. The voltage level of the external synchronizing signal P1 is preferably made higher than the white level Vw of the video signal. However, the voltage level of the external synchronizing signal P1 may be lower than the black level Vb, preferably the pedestal level Vp of the video signal.

In the following description, a frame external synchronizing pulse having a voltage level higher than the white level of the video signal, in particular, a frame external synchronizing pulse corresponding to the phase of a second field is used as the external synchronizing signal P1.

In the embodiment shown in FIG. 2, each video signal generating apparatus 42 is a television camera operated in synchronization with the external synchronizing signal P1. For such a television camera, a well known television camera synchronized by an external synchronizing signal having a voltage level higher than the white level (or lower than the black level) of the video signal, as disclosed in U.S. Pat. No. 4,603,352 may be used.

Each of the television cameras 42 or the transmitting apparatus 12 is allotted an identification number for generating respectively an identification code made of numbers such as 1, 2, 3 . . . n, for injecting the identification code into the video signal during the vertical blanking period.

Each of the television cameras 42 or the transmitting apparatus 12 includes a circuit for generating code signals corresponding to the identification code, and a circuit for generating a composite signal wherein the code signals are injected into the video signal. Such an apparatus is disclosed in U.S. Pat. No. 4,943,864, the content of which, are incorporated herein by reference; therefore, each of the information signals received by each of the receiver circuit 54 incorporates identification code.

The video signal generated by each television camera 42 is fed to a transmission circuit 48 of the corresponding transmitting apparatus 12, and a driver incorporated within the transmission circuit 48 drives the video signal to a photoemissive element 50, such as a light emitting diode. In each receiving apparatus 14, a light signal is directed by the lens 24 to a light receiving element 52 such as a photo transistor for converting the light signal into an electrical signal within the reception circuit 54.

Although not shown, the fiber optic lines 16 extending from each transmitting apparatus 12 are grouped, joint or united together by a bracket or by other means, such as molded together, in a manner that the end face of the fiber optic lines is directed to the light emitted by the photoemissive element 50 through the corresponding lens 20. The fibers optic 16 extending from each receiving apparatus 14 are grouped, joint or united together by a bracket, or by other means, such as molded together, for directing the light signals to the photo transistor 52 through the liquid crystal panel 22 and the lens 24. Each liquid crystal panel 22 is aligned between the corresponding bracket and the lens 24 for positioning each light passing area of the liquid crystal panel 22 against the corresponding fiber optic line.

Figure 4:
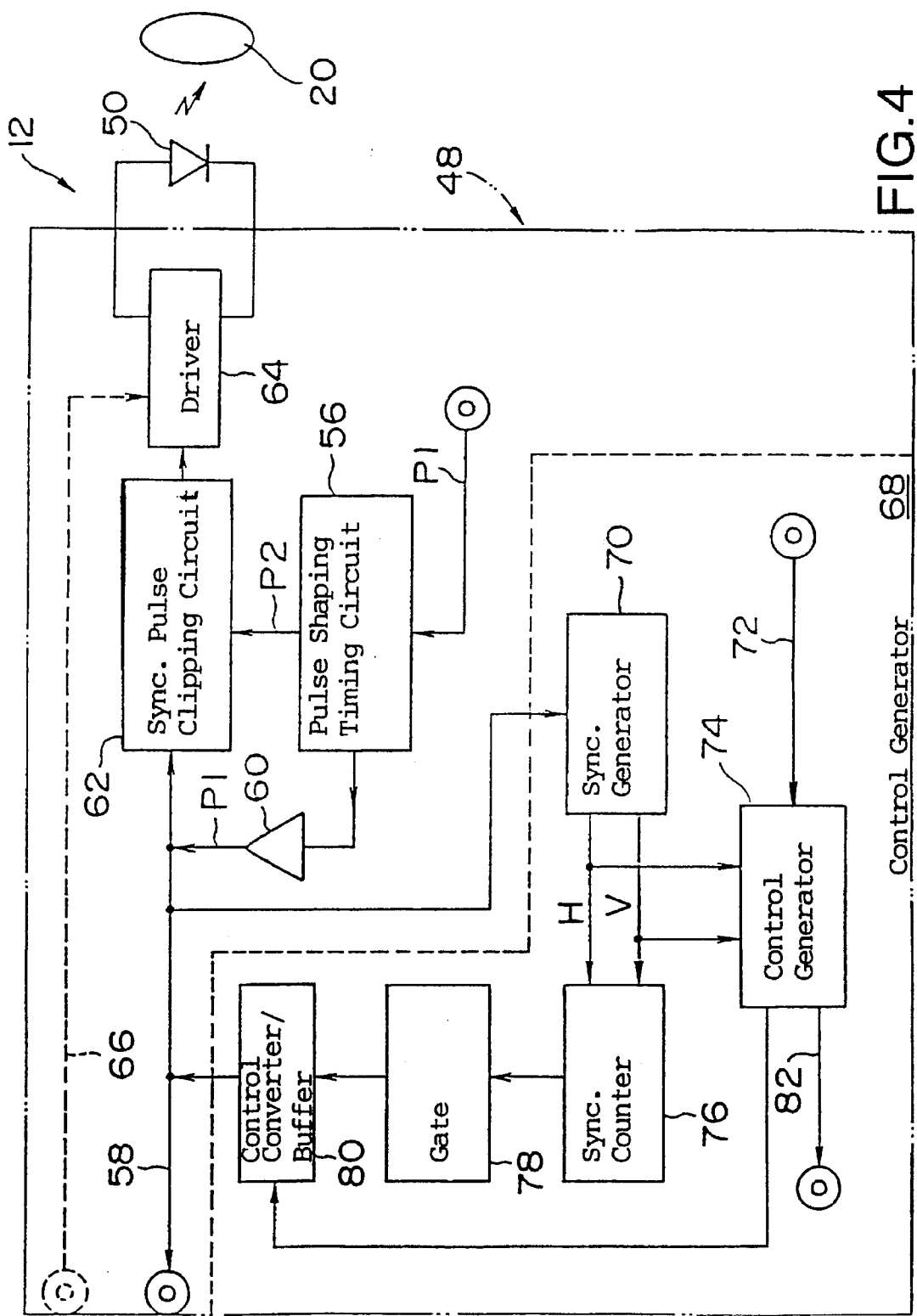
FIG. 4 is a block diagram showing an electric circuit of a transmitting apparatus in the apparatus shown in FIG. 2.

As shown in FIG. 4, each transmission circuit 48 includes a pulse shaping timing circuit 56 for generating a pulse signal P2 shown in FIG. 3(B) synchronized with the external synchronizing signal P1 fed from the external synchronizing signal generator 44 shown in FIG. 2. The pulse shaping timing circuit 56 outputs both the pulse signal P2 and the external synchronizing signal P1. An external synchronizing signal injection circuit 60 receives the pulse signal P1 fed from the pulse shaping timing circuit 56 and injects the pulse signal P1 into the video signal transmission line 58. A synchronizing pulse clipping circuit 62 is provided for clipping the synchronizing pulse P1 from a signal fed from the video signal transmission line 58 and passes through the synchronizing pulse clipping circuit 62, by using the timing signal P2 to clip the pulse P1 and feed a video signal containing no synchronizing pulse P1 to the driver 64.

The synchronizing pulse clipping circuit 62 is fed with the signal shown in FIG. 3(A) from the video signal transmission line 58 and the timing signal P2 shown in FIG. 3(B) from the pulse shaping timing circuit 56. The signal P2 activates the clipping circuit 62 for the duration of P2, thereby the clipping circuit 62 clips the entire signal portion of the signal fed to its input terminal above the black level Vb of the video signal during the period of signal P2, since the duration of P2 covers the period of the external synchronizing pulse P1 the external synchronizing signal P1 is removed by the clipping circuit 62 from the composite video signal transmitted to the receiving apparatus 14, as shown in FIG. 3(C).

Accordingly, even though the external synchronizing signal P1 is present in the video signal fed from the television camera 42 through the transmission line 58 it is removed by the clipping circuit 62, therefore, the external synchronizing signal P1 injected into the video signal transmission line 58 will synchronize the television camera 42 and will not cause any receiving error by the receiving apparatuses 14.

When the television camera 42 also generates an audio signal, the audio signal can be fed to the driver 64 through the transmission line 58 whenever the audio signal is mixed with the video signal or through a separate transmission line 66 and transmitted together with the video signal to the receiving apparatus 14.

Each transmission circuit 48 includes a control generator 68 for generating a control signal for controlling the corresponding television camera 42. The control generator 68 includes a synchronizing separator circuit 70 for separating the horizontal and vertical synchronizing signals H and V from the video signal transmitted through the video signal transmission line 58. Also included is a control signal generator circuit 74 for outputting a control signal for operating the corresponding television camera 42 during predetermined timing using the separated synchronizing signals H and V and the control command fed from the controller 46 shown in FIG. 2 through a control line 72. A counter 76 is provided for counting the number of horizontal scanning lines fed from the sync separator 70 during each frame or field. The control generator 68 also includes a gate circuit 78 for generating a gate signal when the counted value of the counter 76 is a predetermined value, and a buffer circuit 80 controlled by the gate signal for injecting the control signal fed from the control signal generator circuit 74 into the video signal transmission line 58.

In the preferred embodiment of the present invention, the injector circuit may include a mixer circuit wherein the code signals are mixed and injected into the composite video signal. Such a mixer circuit is disclosed in U.S. Pat. No. 4,989,085, the contents of which are incorporated herein by reference, or it can be an injection circuit disclosed in U.S. Pat. No. 5,335,014 the content of which are incorporated herein by reference.

The control command fed to each transmitter circuit 48 through control line 72 from the controller 46 of FIG. 2 may include a control code for switching a power supply on-off, wiper on-off, tilting up-down, panning left-right and zooming tele-wide or the like, or a start or stop command of the transmission of a video signal. The control signal combines the control code corresponding to the control command and the identification code respectively allotted to each of the television cameras 42. In addition, the control signal is injected into the video signal transmission line 58 by the buffer circuit 80 of FIG. 4 at a predetermined time within the vertical blanking period. The injection timing of the control signal into the signal transmission line 58 is different from the injection timing of the external synchronizing signal into the video signal transmission line 58.

The control line 72 may be connected individually to each television camera 42 via each transmitting apparatus individually, or connected in common to the plurality of transmitting apparatuses. When the control line 72 is commonly connected to the plurality of transmitting apparatuses each of the transmitting apparatuses includes an identification code extractor for activating the control generator 74 only when the identification code incorporated in the control code is identical to the identification code of the corresponding television camera connected to the transmitting apparatus, using identical code extraction circuit shown in FIG. 7. Further, the control command can be directly transmitted from the controller 46 to each television camera 42.

It is apparent from the above description that both the external synchronizing signal and the control signal can be transmitted from each transmitting apparatus to the corresponding television camera through the respective video signal transmission line 58.

However, the control signal composed of the control code and the identification code can be transmitted to the television camera 42 through a separate control transmission line 82 instead of the video signal transmission line 58. A twisted pair transmission line or fiber optic transmission line can be used for transmitting the control signal directly to the television camera 42. Similarly, the external synchronizing signal P1 may be transmitted to the television camera through a separate transmission line 89, using coax cable, twisted pair or fiber optic transmission lines. For receiving separate audio signals a separate transmission line 66 using different transmission lines such as twisted pair, fiber optic or shielded cable can be used.

Figure 5:
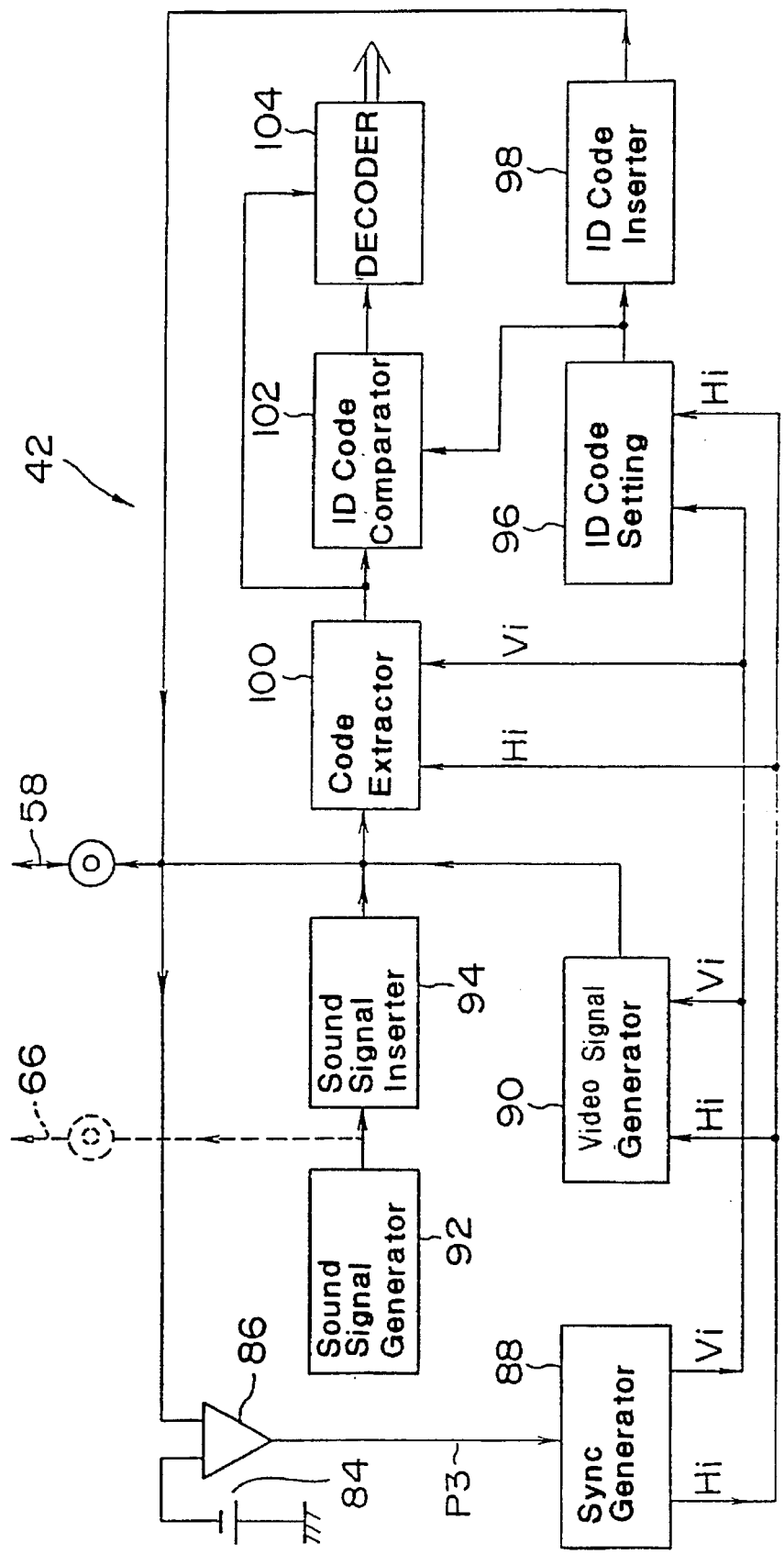
FIG. 5 is a block diagram showing an electric circuit of a television camera in the apparatus shown in FIG. 2.

As shown in FIG. 5, each television camera 42 includes a reference voltage source 84 fed to the voltage comparator 86 for separating the external sync pulse by comparing the voltage level of the external synchronizing signal P1 transmitted from the transmitting apparatus through the video signal transmission line 58 with the reference voltage and generating a pulse signal P3 when P1 levels is same or larger than the reference voltage, an internal synchronizing signal generation circuit 88 is generating internal synchronizing signals Hi and Vi synchronized with the pulse signal P3 fed from the voltage comparator 86, a video signal generation circuit 90 is generating video signal synchronized with the internal synchronizing signals Hi and Vi for feeding it to the video signal transmission line 58, an audio signal generation circuit 92 is generating audio signal along with the video signal and an audio signal injection circuit 94 injects the audio signal into the transmission line 58.

When transmitting an audio signal through the separate transmission line 66 instead of injecting the audio into the video signal transmission line 58, the audio signal injection circuit 94 is not required.

An shown in FIG. 5, each television camera 42 further includes an identification code setting circuit 96 generating an identification code respectively allotted to the television camera 42 for generating an identification code at a predetermined time within the vertical blanking period of the composite video signal on the basis of the internal synchronizing signals Hi and Vi, and an identification code injection circuit 98 for injecting the identification code fed from the setting circuit 96 into the video signal transmission line 58.

The timing of the identification code injection into the video signal transmission line 58 by the injection circuit 98 is different from the timing the control signal is injected into the video signal transmission line 58 by the transmitting apparatus 48 shown in FIG. 4. The control signal is injected into the video signal transmission line 58 by the transmitting apparatus 48 during one or more predetermined horizontal scanning lines during the vertical blanking period of the composite video signal, while the identification code is injected into the video signal transmission line 58 by the television camera 42 during one or more predetermined different horizontal scanning lines during same or another vertical blanking period of the composite video signal.

Figure 6:
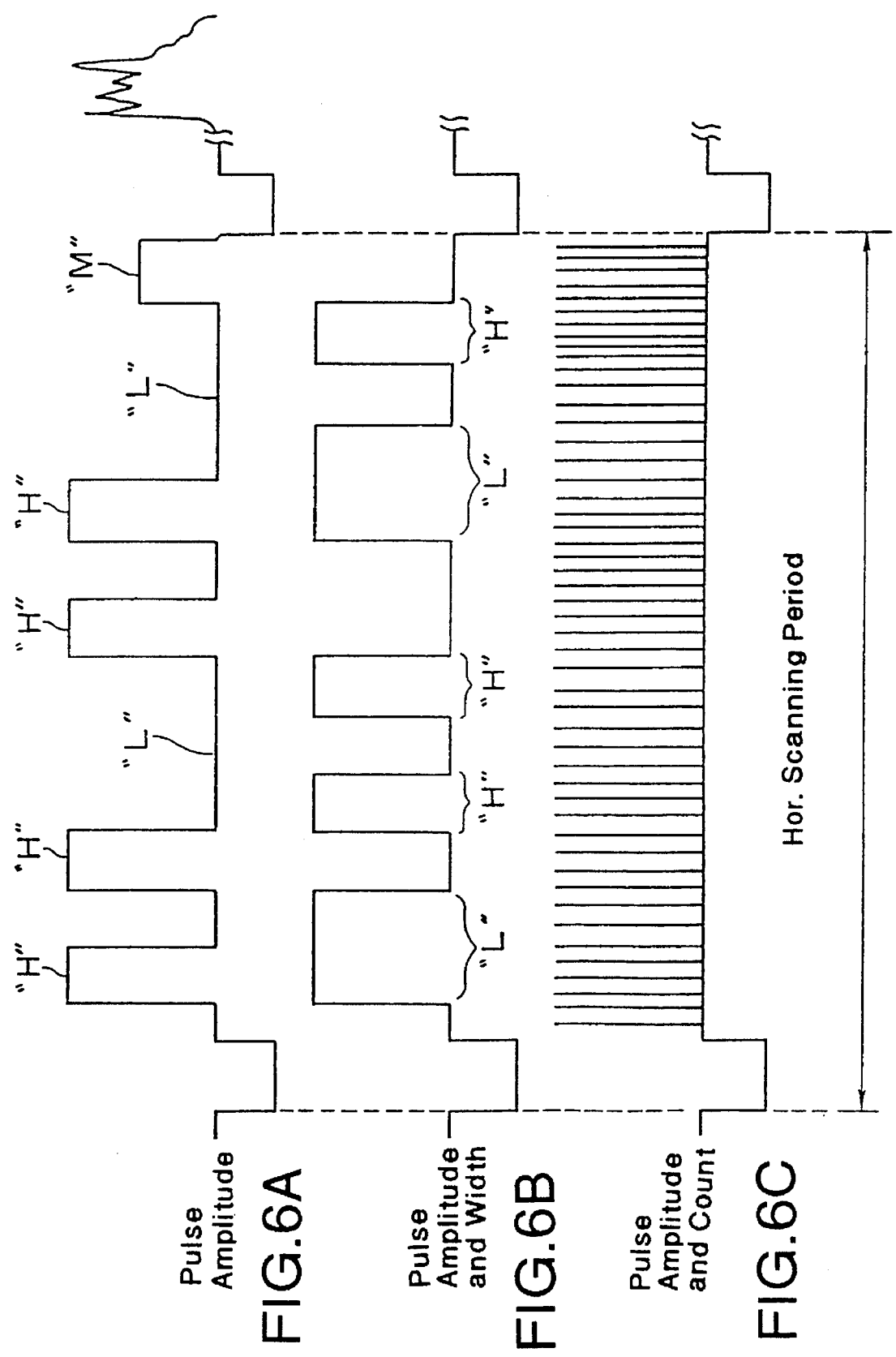
FIG. 6 shows the waveform of an identification code signal.

Identification code signals are shown in FIG. 6(A–C). The identification code signal is a binary code or a bar code signal having two or more levels composed of a high level or white, which is the maximum or highest level of the picture signal in the video signals, a low level or black, which is the lowest level of the picture signal, and a median level or gray, which is the medium level of a picture signals in the video signal generated by the television cameras 42 as shown in FIG. 6A; the identification code may be a combination of pulse signal levels and varying pulse widths as shown in FIG. 6B.

Alternatively, the identification code signal may be either a sine-wave signal or a pulse signal having a frequency corresponding to the identification code, the sine-wave, or the pulse signal is generated during one or more horizontal scanning periods as shown in FIG. 6C, preferably, during the vertical blanking period.

The control generator 74 shown in FIG. 4 generates the control code signals in electronic shaped signals similar to the identification code signal shown in FIG. 6(A–C). However, different shaped electrical signals may be applied to the control code signal and the identification code signal, similarly, the identification code incorporated in the control signal does not have to be identical to the identification code generated by the identification setting circuit 96 of the television camera of FIG. 5. Any code commensurating with the allotted identification to each television camera can be used instead of an identical identification code.

In FIG. 5, each television camera 42 further includes a code extraction circuit 100 for extracting a control code and an identification code transmitted from the control signal generation circuit 74 shown in FIG. 4, an identification code comparing circuit 102 for comparing the extracted identification code with an identification code fed from the identification setting circuit 96 for feeding match signal to the decoder 104 when both codes correspond to each other, and a decoder 104 for decoding the control code fed from the code extraction circuit 100 and generating control commands corresponding to the decoded control code only when the decoder 104 is fed with match signal from the identification code comparator 102.

Figure 7:
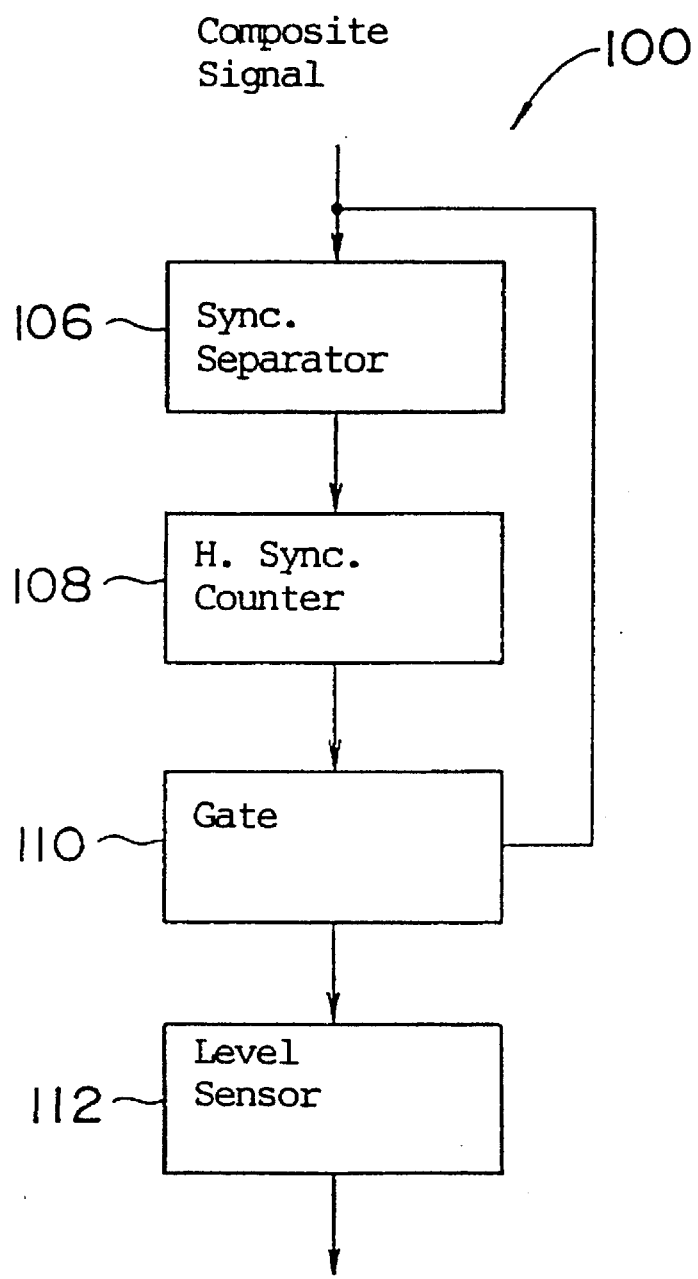
FIG. 7 are block diagrams showing an electric circuit of a code extraction circuit in the television camera shown in FIG. 5 and others.

The code extraction circuit 100 of FIG. 7 incorporates a counter 108 for counting the number of horizontal synchronizing pulses during every field or frame of the video signal, a gate circuit 110 connected to the output of the counter 108 for outputting the video signal fed from transmission line 58 when the counted value of the counter 108 is a predetermined value, a level sensor 112 for sensing a signal level or for detecting the envelop of the signal fed from the gate circuit 110 to reproduce and output the code signal extracted from the video signal fed from transmission line 58.

However, if the control signal composed of control code and the identification code is transmitted to the television camera 42 through a separate control transmission line 82 of FIG. 4 and FIG. 5, the code extraction circuit 100 of FIG. 5 is not required.

The code comparing circuit 102 generates a match signal when the extracted code fed from the extraction circuit 100 corresponds or commensurate to the code set in the setting circuit 96, and generates a mismatch signal when the extracted code fed from the extraction circuit 100 does not correspond or commensurate to the code set in the setting circuit 96.

Referring to FIG. 7A, when using a control code and an identification code having the signal wave form shown in FIG. 6(A) or 6(B), the extraction circuit 76 can be also composed of a synchronizing signal separator circuit 106 for separating the horizontal and the vertical synchronizing signals from a composite signal transmitted from the television camera, a counter 108 for counting the number of horizontal scanning lines of the television camera for each field or frame, a gate circuit 108 for outputting the composite signal transmitted from the television camera only during a period of time when a counted value of the counter 108 is equal to a predetermined value, and a level sensor 112 for reproducing a code signal by sensing the level or the envelope of the output signal of the gate circuit 110.

When using a control code and an identification code having signal waveform shown in FIG. 6C the level sensor circuit may incorporate frequency or pulse counter for counting the frequency or the number of pulses fed from the gate circuit 110.

The decoder 104 of FIG. 5 feeds the different control commands to different drivers for operating the television camera by commanding the power supply on-off, wiper on-off, tilting up-down, panning left-right, zooming tele-wide,-focus near-far, iris open-close or the like, or commanding the start or the stop of the transmission of a video signal.

It has been apparent from the above description that a multiplex signal composed of the video signal consisting of the composite video signal, along with audio signal and the identification code respectively allotted to each television camera is transmitted from each television camera 42 to the corresponding transmitting apparatus 12 through the video signal transmission line 58.

Figure 8:
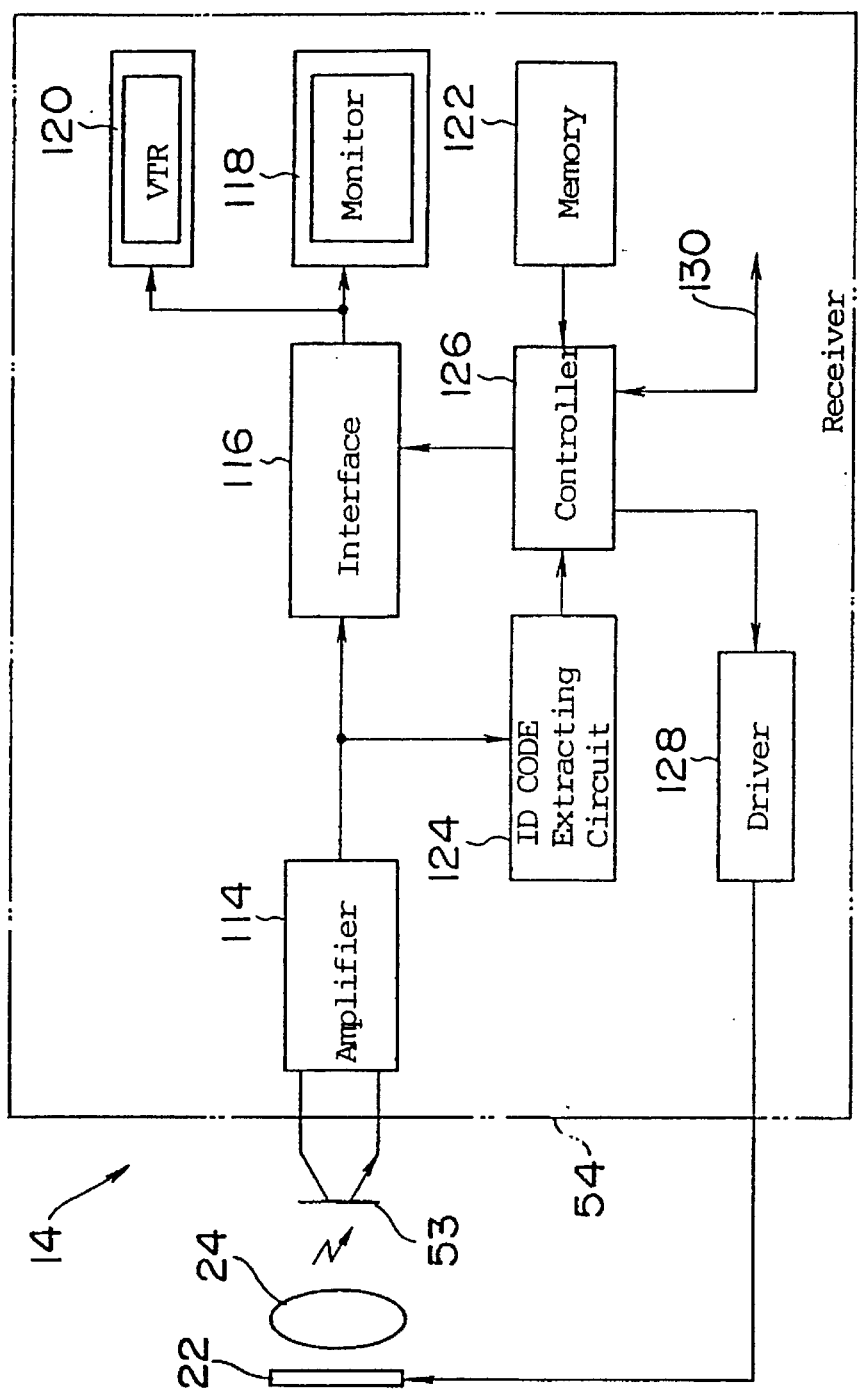
FIG. 8 is a block diagram showing an electric circuit of a receiving apparatus in the apparatus shown in FIG. 2.

As shown in FIG. 8, each receiver circuit 54 includes an amplifier 114 for receiving an information electrical signal converted from the light signal directed to the photo transistor 52 through the fiber optic line 16 (not shown), the liquid crystal panel 22 and the lens 24. The amplified signal from the amplifier 114 is fed to a monitor 118 and a video recorder 120 through an interface circuit 116.

The monitor 118 is a television receiver for displaying an image corresponding to the video signal included in the information signal transmitted from the transmitting apparatus, and for reproducing sound in accordance with the corresponding audio signal included in the information signal. The video recorder 120 is a video tape recorder or video disc recorder for recording and playing back the video signal and the audio signal transmitted from the transmitting apparatus.

Each receiving circuit 54 further includes a memory 122 for storing a data for identifying the television camera generating the video signal being displayed on the monitor 118 and data identifying all other respective television cameras 42 connected to all the respective transmitting apparatuses 12, an identification code extraction circuit 124 for extracting an identification code from the information signal, a controller 126 for identifying the television camera connected to the monitor 118 by reading out the data form the memory 122 on the basis of the code extracted from the information signal and for feeding the identifying data to the interface 116 for superimposing an identification text, numeric or graphic for display onto the picture generated by the video signal on the monitor 118 screen. Similarly, the text, numeric or graphic display can be recorded by the video recorder 120 along with the video signal generated by the television camera 42.

The identifying data may be a graphic illustration data for displaying an installation location, an identification number data, a text description data related to the television camera or its location or the like.

The code extraction circuit 124 is similar to the extraction circuit shown in FIG. 7A which includes a synchronizing signal separator circuit 106 for separating the horizontal and the vertical synchronizing signals from a composite signal transmitted from the television camera, a counter 108 for counting the number of horizontal scanning lines of the television camera for each field or frame, a gate circuit 110 for outputting the composite signal transmitted from the television camera only during a period of time when a counted value of the encounter 108 is equal to a predetermined value, and a level sensor 112 for reproducing a code signal by sensing the level or the envelope of the output signal of the gate circuit 110.

The extracted identification code fed from the extraction circuit 124 is applied by the controller 126 for reading out the stored data from the memory 122. The data fed from memory 122 via the controller 126 is superimposed onto the video signal in the interface circuit 116 for displaying a numeric, text or graphics onto the monitor 118 screen, enabling an operator to recognize the location or position being observed or monitored by the television camera 42. The controller 126 also controls the superimposed display position and switching the display on and off. Such an apparatus for superimposing numeric text or graphics is disclosed in U.S. Pat. No. 4,943,864 the content of which are incorporated herein by reference.

The controller 126 transmits and receives information between the controller 126 and the controller 46 shown in FIG. 2 through an internal control line 130. A signal fed from the control circuit 46 to the controller 126 also contains control signals for switching-on or switching-over the light passing areas of the liquid crystal panel 22 for selecting any of the television cameras 42 and an external synchronizing signal for controlling the timing of the switching-on or switching-over from one light passing area of the liquid crystal panel to another.

The controller 126 feeds a drive command to the driver 128 which controls all the individual light passing areas of the liquid crystal panel 22, synchronized with the external synchronizing signal, therefore, the driver 128 drives the liquid crystal panel 22 to switch-on any of the light passing areas or switch-over from one light passing area to another in accordance to the drive command and in synchronization with the external synchronization signal.

As a result, the mixed video and the audio signals generated by the television camera selected through the controller 46 are fed to monitor 118 for reproducing a picture display and a sound, along with recording of the video and audio signals onto the video recorder 120. Therefore, an operator operating the controller 126 can select for monitoring and recording any of the television cameras through any of the respective receiving apparatuses 14. The operator can further superimpose any numeric, text or graphics of the displayed signal into the displayed picture reproduced from the video signal.

Further, when the superimposed numeric, text or graphics obstruct the observed picture, the operator can reposition the superimposed display or switch off the superimposed display from the monitor screen.

According to the information signal selecting apparatus 10 of FIG. 2, the transmitting apparatuses and the receiving apparatuses can be connected together by a simple apparatus in an arbitrary combination with each other, whereby, one, two or any arbitrary transmitting apparatuses can be connected to a plurality of arbitrary receiving apparatus.

Further, since the switching-on or the switch-over timing of the light passing areas of the liquid crystal panel 22 is synchronized by the external synchronizing signal fed from the controller 126 along with the selection information, the liquid crystal panel 22 switches-over the information transmission synchronously with the vertical retrace of the video signal. As a result, the reproduced picture images during and immediately after the switching-on or the switching-over from one camera signal to another are not disturbed.

When the television camera is synchronized by the well known horizontal and vertical synchronizing signals, or by the well known composite synchronizing signal, or by the well known horizontal and vertical drive signals, a generation circuit for the horizontal and vertical synchronizing signal, the composite synchronizing signal or the horizontal and vertical drive signals can be used instead of the external synchronizing signal generator circuit 44 of FIG. 2. Accordingly, the external synchronizing signal injection circuit 60 and the clipping circuit 62 shown in FIG. 4 will not be required.

Instead of providing the external synchronizing signal injection circuit 60 and the clipping circuit 62 in the transmitting apparatus 12, the external synchronizing signal P1 can be directly fed through a separate transmission line 89 to the level comparing circuit 86 in FIG. 5, of the television camera 42. When the television camera is not provided with any level comparing circuit, a signal corresponding to the pulse signal P3 can be fed directly as a vertical external synchronizing signal to the internal synchronizing signal generator circuit 88 of the television camera 42 through a separate transmission line 89. In the latter case, the external synchronizing signal injection circuit 60 and the clipping circuit 62 of the transmitting apparatus 12 shown in FIG. 4 are not required.

A mixing circuit for mixing the audio signal with the video signal (not shown), included in the driver circuit 64 of the transmission circuit 48 can be a well known circuit for modulating a carrier wave by an audio signal, and for outputting a composite video signal mixed with the modulated audio. In this case, the receiving circuit 54 includes a well known circuit for demodulating the audio signal.

Further, the mixing circuit of the driver circuit 64 can be provided with a circuit for compressing a time base of an audio signal at such a rate that a time corresponding to one vertical scanning period of a video signal becomes equal to a time corresponding to one or more horizontal scanning period of the video signal, and for injecting the compressed audio signal during the vertical blanking period of the video signal. In this case, the receiving circuit 54 includes a circuit for extracting the compressed audio signal from the video signal and for decompressing the time base of the extracted audio signal.

Other circuits can be used instead of a mixing circuit of the driver circuit 64 described above. The audio signal injection circuit 94 of the television camera 42 shown in FIG. 5, can also be a circuit similar to the mixing circuit of the driver circuit of the transmission circuit 48 shown in FIG. 4.

The control signal for controlling the television camera 42 can be fed from a single controller to any arbitrary number of transmitting apparatus, instead of to all the transmitting apparatuses. Otherwise, a controller may be respectively provided for each transmitting apparatus to feed the control signal from each controller individually to each of the transmitting apparatus 12.

Further, instead of having a single controller for each individual receiving apparatus, two or any arbitrary number of receiving apparatuses can be controlled by a single controller. Otherwise, a controller may be respectively provided for all the receiving apparatus to control individually each receiving apparatus. In addition, the control signal may be transmitted from each receiving apparatus to each transmitting apparatus through the fiber optic lines 16.

Instead of transmitting the control signal from the control circuit 46 to the transmitting apparatus 12 through the transmission line 72, the control signal can be transmitted from the control circuit 46 to the transmitting apparatus 12 through the receiving apparatus 14 and the fiber optic lines 16.

Figure 9:
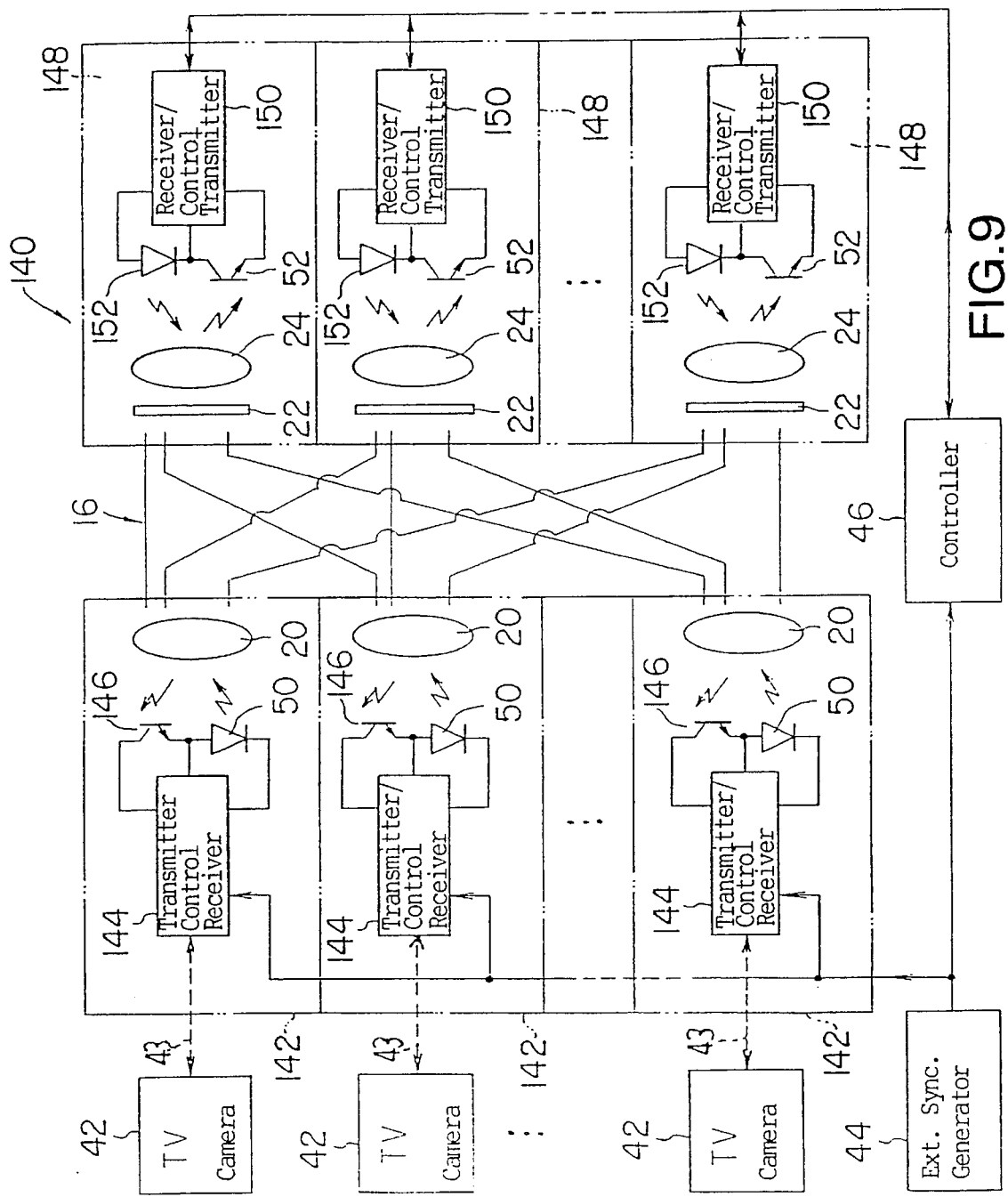
FIG. 9 is a view showing an apparatus for selective routing of information signals in accordance with a second preferred embodiment of the present invention.

FIG. 9 shows an embodiment of an apparatus 140 for the selective routing of information signals. The apparatus 140 transmits a control command from the control circuit 46 to the transmitting apparatus 12 through the receiving apparatus 14 and the fiber optic lines 16. As described above, the control command is coded control signal fed to the television cameras 42, for operating the television cameras, such as panning left-right or tilting up-down.

The transmitter/control receiver means 144 of the transmitting apparatus 142 includes in addition to the transmitter 48 and the photoemissive element 50 shown in FIG. 2 a control receiving circuit and a light receiving element 146, such as a photo transistor. The light receiving element 146 is positioned to receive the light signals from all the corresponding fiber optic lines 16 through the corresponding lens 20.

The receiver/control transmitter means 150 of the receiving apparatus 148, of the apparatus 140, includes in addition to the receiver 54 and light receiving element 52 shown in FIG. 2 a control transmitting circuit and a photoemissive element 152, such as, light emitting diode. The photoemissive element is positioned to generate light signal to all the corresponding fiber optic lines 16, through the corresponding lens 24 and the liquid crystal panel 22.

Figure 10:
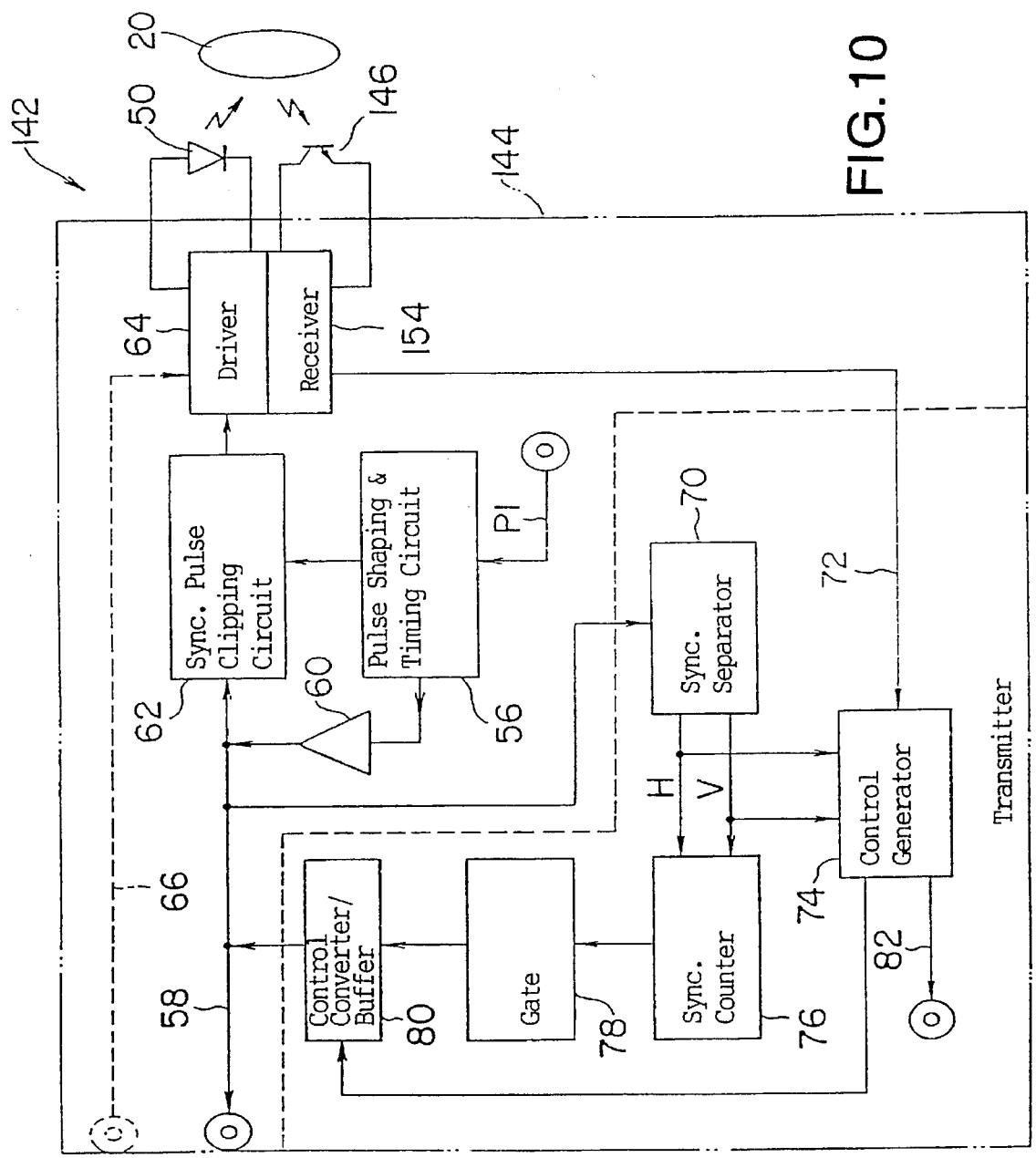
FIG. 10 is a block diagram showing an electric circuit of a transmitting apparatus in the apparatus shown in FIG. 9.

As shown in FIG. 10, the transmitter control receiver means 144 of each transmitting apparatus 142 includes, in addition to each circuit provided in the transmission circuit 48 shown in FIG. 4, a converter 154 for converting a light signal fed to the photo transistor 146 into an electrical signal for reproducing a control command on the basis of the converted electrical signal. The reproduced control command is fed to the control signal generation circuit 74.

The converter 154 may include an amplifier and a code reproduction circuit for reproducing a control command on the basis of the output signal of the amplifier. The code reproduction circuit of the converter 154 can be composed of a well known circuits, such as, the code setting circuit 96, the code extraction circuit 100, the code comparing circuit 102 and the decoder 104 shown in FIG. 5. Accordingly, the circuit corresponding to the decoder 104 feeds the control code only or both the control code and the identification code to the control signal generation circuit 74.

Figure 11:
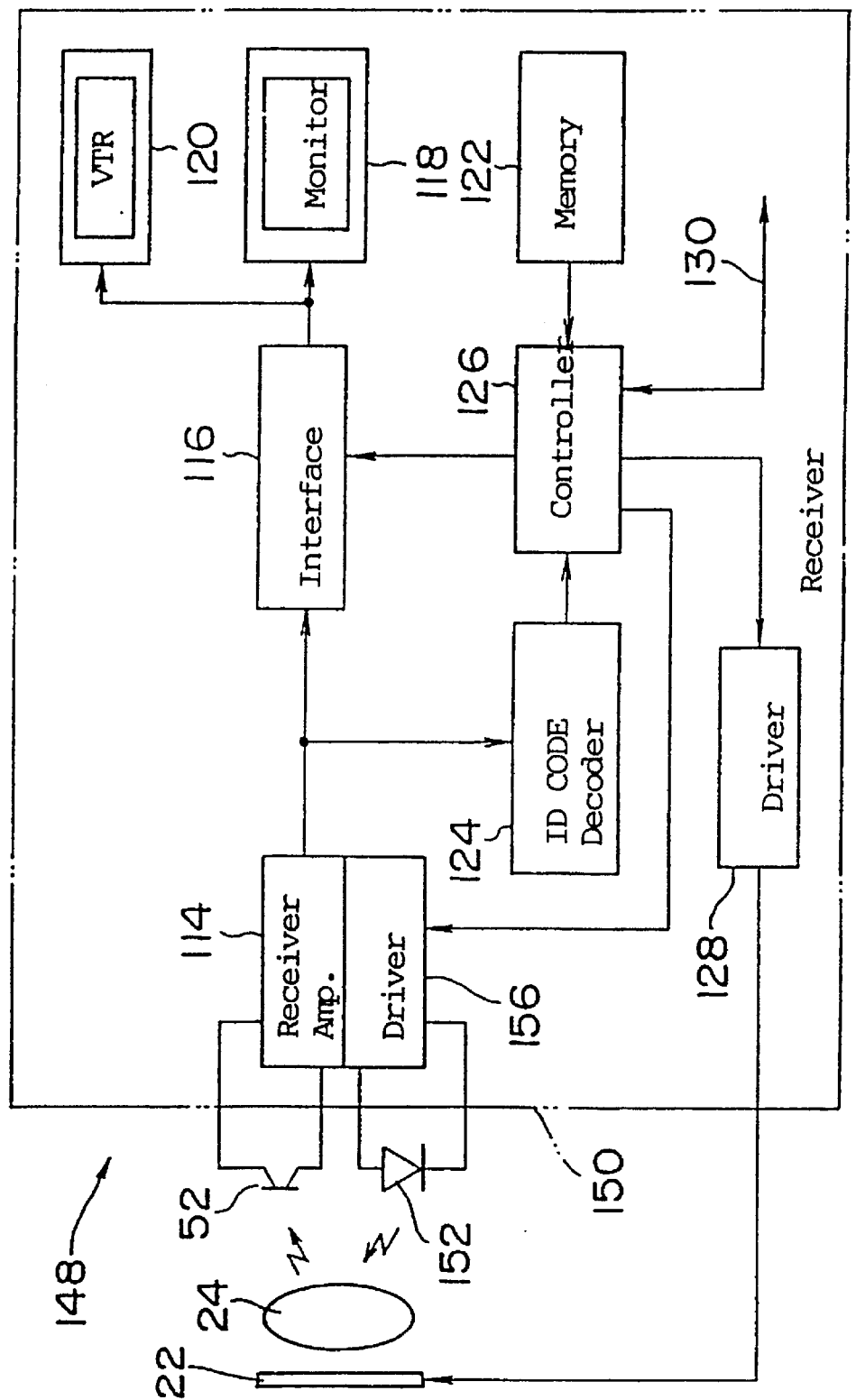
FIG. 11 is a block diagram showing an electric circuit of a receiving apparatus in the apparatus shown in FIG. 9.

As shown in FIG. 11, the receiver/control transmitter means 150 of each receiving apparatus 148 includes, in addition to each circuit provided in the receiver circuit 54 shown in FIG. 4, a control driver 156 for driving the photoemissive element 152 with control command signal fed from the control circuit 46 shown in FIG. 9 through the transmission line 130 and the controller 126. The control command can be fed from the control circuit 46 shown in FIG. 9 to the driver 156 shown in FIG. 11 directly.

In the embodiment shown in FIG. 9, both the information signal fed from the transmitting apparatus 142 to the receiving apparatus 148 and the control signal fed from the receiving apparatus 148 to the transmitting apparatus 142 can be transmitted through a common fiber optic lines 16 or through a separate fiber optic lines 16 which are grouped, united or joint together by a bracket 30 or by other means, such as molded together.

Figure 12:
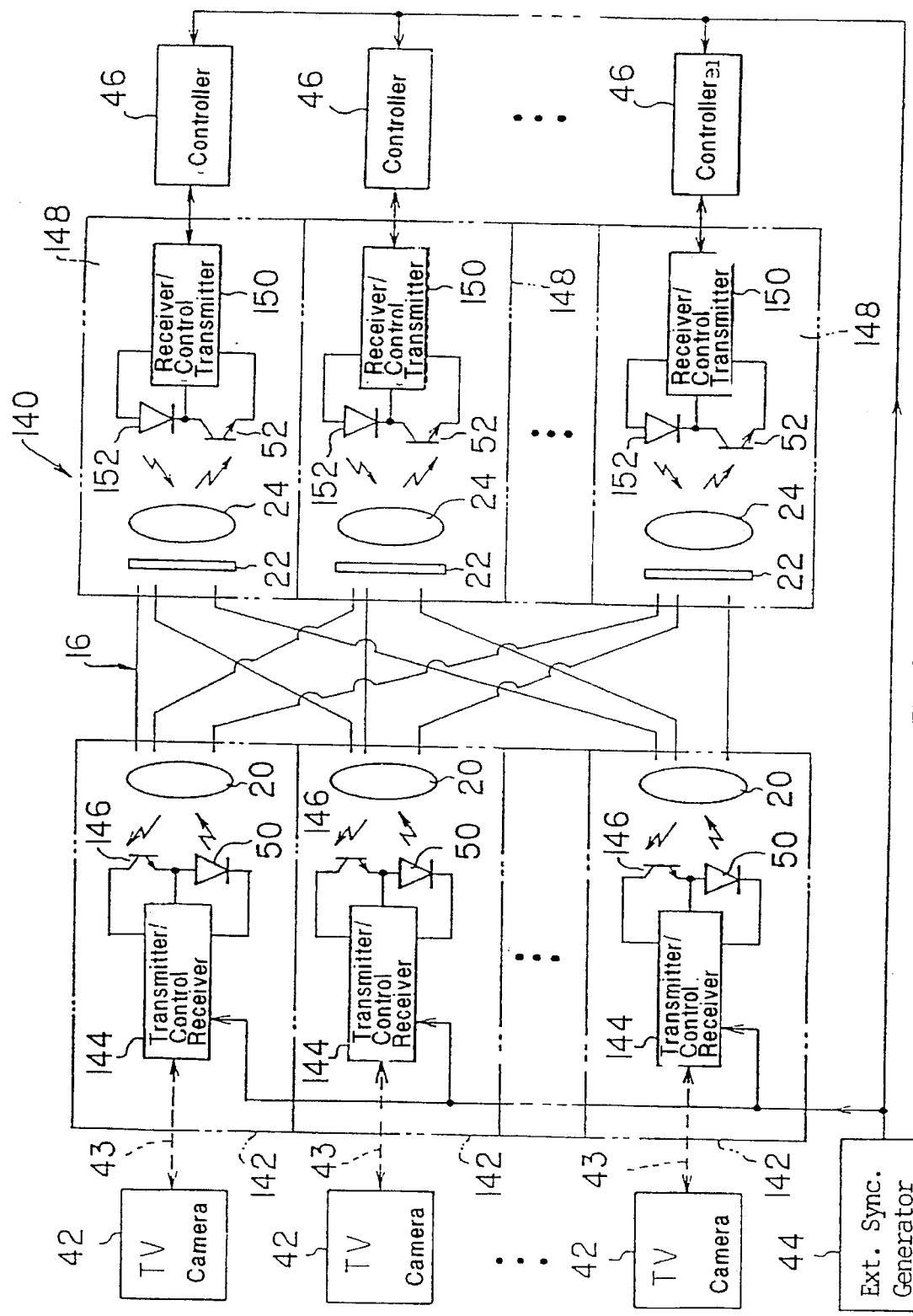
FIG. 12 is a block diagram showing an apparatus for the selective routing of information signals in accordance with a further preferred embodiment of the present invention.

The control command can be fed from a single control circuit 46 to a plurality of receiving apparatus 14 instead of to all the receiving apparatuses shown in FIG. 2. Otherwise, as shown in FIG. 12, one control circuit 46 can be respectively provided for each receiving apparatus 148 to feed the control command from each control circuit 46 to the corresponding receiving apparatus 148. As shown in the embodiment of FIG. 12, each receiving apparatus 148 is controlled by the corresponding control circuit 46.

Therefore, instead of controlling all the receiving apparatuses 14 by a single control circuit 46 as in the embodiment shown in FIG. 2, one control circuit 46 can be respectively provided for each receiving apparatus 14 or 148 to control individually each receiving apparatus 14 or 148 by the corresponding control circuit 46.

Figure 13:
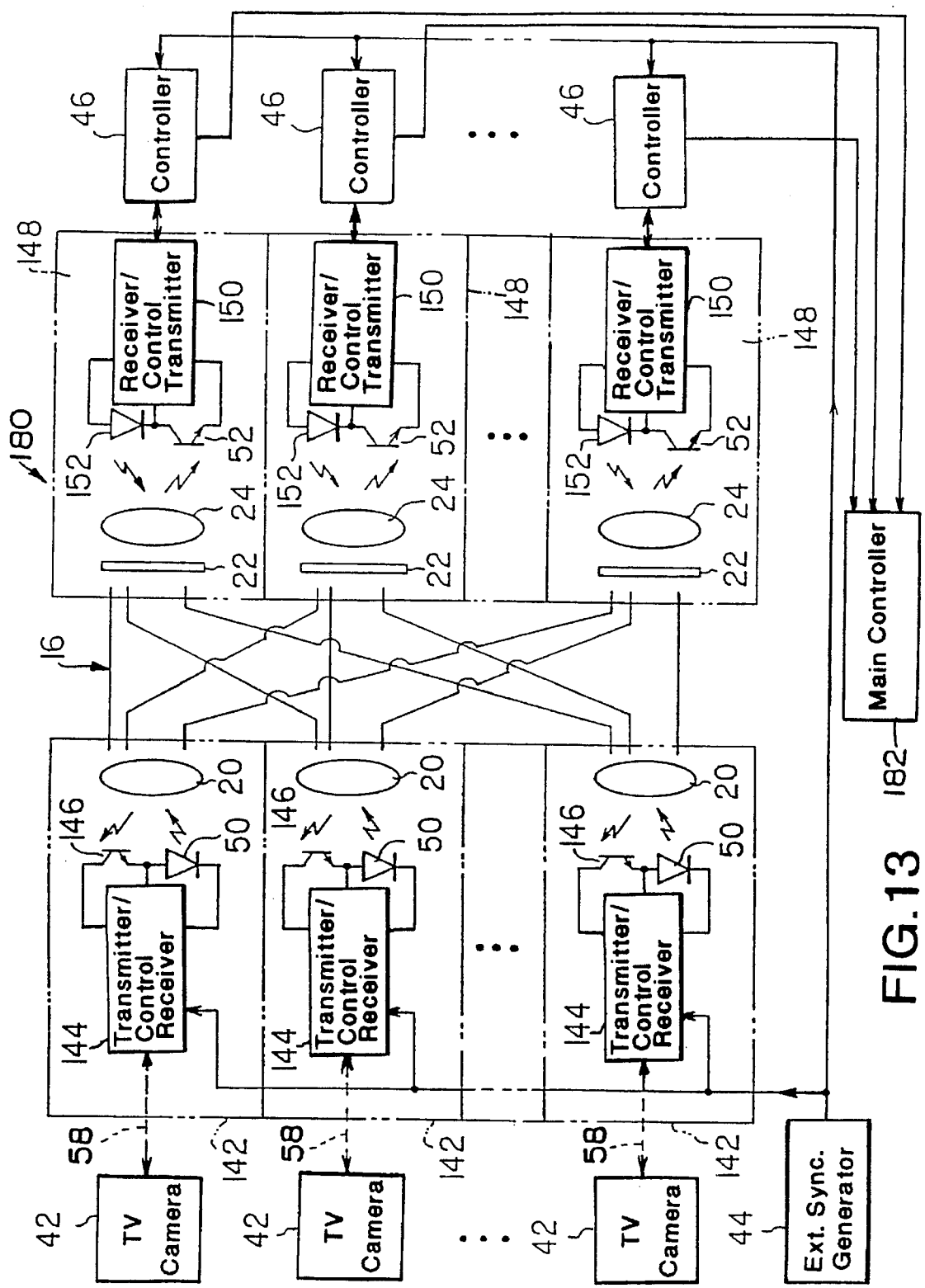
FIG. 13 is a block diagram showing an apparatus for the selective routing of information signals in accordance with yet further preferred embodiment of the present invention.

An information signal selecting apparatus 180 shown in FIG. 13 further consists of a main control circuit 182 connected to all the respective controllers 46 circuit for receiving current data of the selection in process from each controller 46, and feeding signals to the respective controllers 46 for coordinating the controlling of the video cameras 42 by the respective controllers 46 of the respective receiving apparatus 148. The controller 46 transmits the control signal to the transmitting apparatus 142 in a similar manner to the information selecting apparatus 140 of FIG. 12. The main control circuit 182 can prevent the same television camera 42 from being driven by the control signals fed from a plurality of different receiving apparatuses 148, thereby preventing contradictory control signals from being fed to the same television camera 42 and can generate its own control signals to any of the television cameras 42, through any of the respective controllers 46.

In the embodiment described above, there are as many transmitting apparatuses 142 as there are receiving apparatuses 148. However, the number of transmitting apparatuses 142 may be different from that of receiving apparatuses 148. Further, for an information generating apparatus for generating information signals any signal generating apparatus or other apparatus may be used, instead of the video signal generating apparatus, composed of the television camera 42.

The present invention can be applied not only to the information signal selecting apparatus used in a monitoring system but also to any other information apparatuses.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. An apparatus for the selective routing of information signals, comprising:

a plurality of transmitting means, each having a transmitter for transmitting an information signal by converting said information signal into a light signal;

a plurality of fiber optic lines for carrying said light signal from said transmitting means, each fiber optic line respectively corresponding to one of said transmitting means; and at least one receiving means for selectively receiving said light signal carried by said fiber optic lines;

wherein said receiving means includes a liquid crystal panel having a plurality of light passing areas the optical transmission properties of said plurality of light passing areas being individually controlled, receiving light from said fiber optic lines, each light passing area respectively corresponding to one of said fiber optic lines, a receiver for generating an electrical signal from the light passing through said liquid crystal panel, add a selection means for individually controlling said light passing areas for selecting any of said light passing areas to be switched on so as to selectively connect, by said fiber optic lines, said transmitting means and said receiving means in any arbitrary combination with each other.

2. An apparatus according to claim 1, wherein each transmitter includes a photoemissive element for generating said light signal, and a driver for driving the photoemissive element by said information signal, and wherein said receiver includes a light receiving element for receiving said light signal passing through said liquid crystal panel, and a converter for converting said light signal received by said light receiving element into electrical output signal.

3. An apparatus according to claim 2, wherein each transmitting means further includes a lens for directing said light signal generated by said photoemissive element toward said fiber optic lines, and wherein said receiving means further includes a lens for directing said light signal passing through said liquid crystal panel toward said receiver.

4. An apparatus according to claim 1, further comprising:

a plurality of video signal generating means respectively connected to said plurality of transmitting means through a transmission line for feeding a video signal as said information signal to the transmitter of the corresponding transmitting means; and video signal processing means for reproducing and/or recording an image corresponding to the video signal contained in an electrical output signal output from said receiver.

5. An apparatus according to claim 2, further comprising:

a plurality of video signal generating means respectively connected to said plurality of transmitting means through a transmission line for feeding a video signal as said information signal to the transmitter of the corresponding transmitting means; and video signal processing means for reproducing and/or recording an image corresponding to the video signal contained in said electrical output signal fed from said receiver.

6. An apparatus according to claim 3, further comprising:

a plurality of video signal generating means respectively connected to said plurality of transmitting means through a transmission line for feeding a video signal as said information signal to the transmitter of the corresponding transmitting means; and video signal processing means for reproducing and/or recording an image corresponding to the video signal contained in said electrical output signal fed from said receiver.

7. An apparatus according to claim 4, further comprising:

an external synchronizing signal generating means for generating and feeding external synchronizing signal to said video signal generating means;

wherein each video signal generating means includes a synchronizing signal generation circuit for generating composite video signals synchronized with said external synchronizing signal.

8. An apparatus according to claim 5, further comprising:
an external synchronizing signal generating means for generating and feeding an external synchronizing signal to said video signal generating means;
wherein each video signal generating means includes a synchronizing signal generation circuit for generating composite video signals synchronized with said external synchronizing signal.

9. An apparatus according to claim 6, further comprising:
an external synchronizing signal generating means for generating and feeding an external synchronizing signal to said video signal generating means;
wherein each video signal generating means includes a synchronizing signal generation circuit for generating composite video signals synchronized with said external synchronizing signal.

10. An apparatus according to claim 7, wherein said external synchronizing signal is a pulse signal having a voltage level higher than the maximum voltage level or lower than the minimum voltage level of said video signal, generated during the vertical blanking period of said video signal, wherein each transmitting means includes a circuit for injecting said external synchronizing signal into a transmission line extending from said video signal generating means to said transmitter or through a separate transmission line, and wherein said video signal generating means further includes a comparing circuit for extracting said external synchronizing signal by comparing the signal level of said pulse signal with a reference signal having a predetermined voltage level and for applying the extracted external synchronizing signal to said synchronizing signal generation circuit.

11. An apparatus according to claim 8, wherein said external synchronizing signal is a pulse signal having a voltage level higher than the maximum voltage level or lower than the minimum voltage level of said video signal, generated during the vertical blanking period of said video signal, wherein each transmitting means includes a circuit for injecting said external synchronizing signal into a transmission line extending from said video signal generating means to said transmitter or through a separate transmission line, and wherein said video signal generating means further includes a comparing circuit for extracting said external synchronizing signal by comparing the signal level of said pulse signal with a reference signal having a predetermined voltage level and for applying the extracted external synchronizing signal to said synchronizing signal generation circuit.

12. An apparatus according to claim 9, wherein said external synchronizing signal is a pulse signal having a voltage level higher than the maximum voltage level or lower than the minimum voltage level of said video signal, generated during the vertical blanking period of said video signal, wherein each transmitting means includes a circuit for injecting said external synchronizing signal into a transmission line extending from said video signal generating means to said transmitter or through a separate transmission line, and wherein said video signal generating means further includes a comparing circuit for extracting said external synchronizing signal by comparing the signal level of said pulse signal with a reference signal having a predetermined voltage level and for applying the extracted external synchronizing signal to said synchronizing signal generation circuit.

13. An apparatus according to claim 10, wherein each transmitting means further includes a circuit for removing said external synchronizing signal from the information signal converted into light signal.

14. An apparatus according to claim 11, wherein each transmitting means further includes a circuit for removing said external synchronizing signal from the signal fed to said driver.

15. An apparatus according to claim 12, wherein each transmitting means further includes a circuit for removing said external synchronizing signal from the signal fed to said driver.

16. An apparatus according to claim 4, wherein each video signal generation means includes an identification code signal generation circuit for generating an identification code signal corresponding to an identification code respectively allotted to said video signal generating means for injecting said identification code signal into said video signal, and wherein said receiving means further includes an identification code signal processing means for extracting said identification code signal from said electrical signal for feeding the extracted identification code signal to said video signal processing means.

17. An apparatus according to claim 5, wherein each video signal generation means includes an identification code signal generation circuit for generating an identification code signal corresponding to an identification code respectively allotted to said video signal generating means for injecting said identification code signal into said video signal, and wherein said receiving means further includes an identification code signal processing means for extracting said identification code signal from said electrical output signal for feeding the extracted identification code signal to said video signal processing means.

18. An apparatus according to claim 6, wherein each video signal generation means includes an identification code signal generation circuit for generating an identification code signal corresponding to an identification code respectively allotted to said video signal generating means for injecting said identification code signal into said video signal, and wherein said receiving means further includes an identification code signal processing means for extracting said identification code signal from said electrical output signal for feeding the extracted identification code signal to said video signal processing means.

19. An apparatus according to claim 7, wherein each video signal generation means includes an identification code signal generation circuit for generating an identification code signal corresponding to an identification code respectively allotted to said video signal generating means for injecting said identification code signal into said video signal, and wherein said receiving means further includes an identification code signal processing means for extracting said identification code signal from said electrical output signal for feeding the extracted identification code signal to said video signal processing means.

20. An apparatus according to claim 8, wherein each video signal generation means includes an identification code signal generation circuit for generating an identification code signal corresponding to an identification code respectively allotted to said video signal generating means for injecting said identification code signal into said video signal, and wherein said receiving means further includes an identification code signal processing means for extracting said identification code signal from said electrical output signal for feeding the extracted identification code signal to said video signal processing means.

21. An apparatus according to claim 9, wherein each video signal generation means includes an identification code signal generation circuit for generating an identification code signal corresponding to an identification code respectively allotted to said video signal generating means for injecting said identification code signal into said video signal, and wherein said receiving means further includes an identification code signal processing means for extracting said identification code signal from said electrical output signal for feeding the extracted identification code signal to said video signal processing means.

22. An apparatus according to claim 10, wherein each video signal generation means includes an identification code signal generation circuit for generating an identification code signal corresponding to an identification code respectively allotted to said video signal generating means for injecting said identification code signal into said video signal, and wherein said receiving means further includes an identification code signal processing means for extracting said identification code signal from said electrical output signal for feeding the extracted identification code signal to said video signal processing means.

23. An apparatus according to claim 11, wherein each video signal generation means includes an identification code signal generation circuit for generating an identification code signal corresponding to an identification code respectively allotted to said video signal generating means for injecting said identification code signal into said video signal, and wherein said receiving means further includes an identification code signal processing means for extracting said identification code signal from said electrical output signal for feeding the extracted identification code signal to said video signal processing means.

24. An apparatus according to claim 12, wherein each video signal generation means includes an identification code signal generation circuit for generating an identification code signal corresponding to an identification code respectively allotted to said video signal generating means for injecting said identification code signal into said video signal, and wherein said receiving means further includes an identification code signal processing means for extracting said identification code signal from said electrical output signal for feeding the extracted identification code signal to said video signal processing means.

25. An apparatus according to claim 16 wherein each identification code signal processing means includes a memory for storing an identification data for each allotted identification code, a decoding circuit for decoding the extracted said identification code signal to generate a decoder signal, and a controller for retrieving said identification data pertaining said decoder signal from said memory for superimposing said identification data onto said video signal.

26. An apparatus according to claim 17 wherein each identification code signal processing means includes a memory for storing an identification data for each allotted identification code, a decoding circuit for decoding the extracted said identification code signal to generate a decoder signal, and a controller for retrieving said identification data pertaining said decoder signal from said memory for superimposing said identification data onto said video signal.

27. An apparatus according to claim 18 wherein each identification code signal processing means includes a memory for storing an identification data for each allotted identification code, a decoding circuit for decoding the extracted said identification code signal to generate a decoder signal, and a controller for retrieving said identification data pertaining said decoder signal from said memory for superimposing said identification data onto said video signal.

28. An apparatus according to claim 19 wherein each identification code signal processing means includes a memory for storing an identification data for each allotted identification code, a decoding circuit for decoding the extracted said identification code signal to generate a decoder signal, and a controller for retrieving said identification data pertaining said decoder signal from said memory for superimposing said identification data onto said video signal.

29. An apparatus according to claim 20 wherein each identification code signal processing means includes a memory for storing an identification data for each allotted identification code, a decoding circuit for decoding the extracted said identification code signal to generate a decoder signal, and a controller for retrieving said identification data pertaining said decoder signal from said memory for superimposing said identification data onto said video signal.

30. An apparatus according to claim 21 wherein each identification code signal processing means includes a memory for storing an identification data for each allotted identification code, a decoding circuit for decoding the extracted said identification code signal to generate a decoder signal, and a controller for retrieving said identification data pertaining said decoder signal from said memory for superimposing said identification data onto said video signal.

31. An apparatus according to claim 22 wherein each identification code signal processing means includes a memory for storing an identification data for each allotted identification code, a decoding circuit for decoding the extracted said identification code signal to generate a decoder signal, and a controller for retrieving said identification data pertaining said decoder signal from said memory for superimposing said identification data onto said video signal.

32. An apparatus according to claim 23 wherein each identification code signal processing means includes a memory for storing an identification data for each allotted identification code, a decoding circuit for decoding the extracted said Identification code signal to generate a decoder signal, and a controller for retrieving said identification data pertaining said decoder signal from said memory for superimposing said identification data onto said video signal.

33. An apparatus according to claim 24 wherein each identification code signal processing means includes a memory for storing an identification data for each allotted identification code, a decoding circuit for decoding the extracted said identification code signal to generate a decoder signal, and a controller for retrieving said identification data pertaining said decoder signal from said memory for superimposing said identification data onto said video signal.

34. An apparatus according to claim 25, further comprising:

control means for generating a control signal combining a coded control command for controlling said video signal generating means together with annexed identification code signal corresponding to the identification code respectively allotted to each video signal generating means;

wherein said control signal is applied to said video signal generating means to operate a circuit corresponding to said control signal, only when the identification code signal annexed to said control signal corresponds to the identification code signal allotted to said video signal generating means.

35. An apparatus according to claim 26, further comprising:
control means for generating a control signal combining a coded control command for controlling said video signal generating means together with annexed identification code signal corresponding to the identification code respectively allotted to each video signal generating means;
wherein said control signal is applied to said video signal generating means to operate a circuit corresponding to said control signal, only when the identification code signal annexed to said control signal corresponds to the identification code signal allotted to said video signal generating means.

36. An apparatus according to claim 27, further comprising:
control means for generating a control signal combining a coded control command for controlling said video signal generating means together with annexed identification code signal corresponding to the identification code respectively allotted to each video signal generating means;
wherein said control signal is applied to said video signal generating means to operate a circuit corresponding to said control signal, only when the identification code signal annexed to said control signal corresponds to the identification code signal allotted to said video signal generating means.

37. An apparatus according to claim 28, further comprising:
control means for generating a control signal combining a coded control command for controlling said video signal generating means together with annexed identification code signal corresponding to the identification code respectively allotted to each video signal generating means;
wherein said control signal is applied to said video signal generating means to operate a circuit corresponding to said control signal, only when the identification code signal annexed to said control signal corresponds to the identification code signal allotted to said video signal generating means.

38. An apparatus according to claim 29, further comprising:
control means for generating a control signal combining a coded control command for controlling said video signal generating means together with annexed identification code signal corresponding to the identification code respectively allotted to each video signal generating means;
wherein said control signal is applied to said video signal generating means to operate a circuit corresponding to said control signal, only when the identification code signal annexed to said control signal corresponds to the identification code signal allotted to said video signal generating means.

39. An apparatus according to claim 30, further comprising:
control means for generating a control signal combining a coded control command for controlling said video signal generating means together with annexed identification code signal corresponding to the identification code respectively allotted to each video signal generating means;
wherein said control signal is applied to said video signal generating means to operate a circuit corresponding to said control signal, only when the identification code signal annexed to said control signal corresponds to the identification code signal allotted to said video signal generating means.

40. An apparatus according to claim 31, further comprising:
control means for generating a control signal combining a coded control command for controlling said video signal generating means together with annexed identification code signal corresponding to the identification code respectively allotted to each video signal generating means;
wherein said control signal is applied to said video signal generating means to operate a circuit corresponding to said control signal, only when the identification code signal annexed to said control signal corresponds to the identification code signal allotted to said video signal generating means.

41. An apparatus according to claim 32, further comprising:
control means for generating a control signal combining a coded control command for controlling said video signal generating means together with annexed identification code signal corresponding to the identification code respectively allotted to each video signal generating means;
wherein said control signal is applied to said video signal generating means to operate a circuit corresponding to said control signal, only when the identification code signal annexed to said control signal corresponds to the identification code signal allotted to said video signal generating means.

42. An apparatus according to claim 33, further comprising:
control means for generating a control signal combining a coded control command for controlling said video signal generating means together with annexed identification code signal corresponding to the identification code respectively allotted to each video signal generating means;
wherein said control signal is applied to said video signal generating means to operate a circuit corresponding to said control signal, only when the identification code signal annexed to said control signal corresponds to the identification code signal allotted to said video signal generating means.

43. An apparatus according to claim 34, wherein said control signal is injected into said transmission line extended from said transmitting means to said video signal generating means, and wherein said video signal generating means further includes a control signal processing means for extracting said control signal from said transmission line for feeding the extracted control signal to a circuit corresponding to said extracted control signal, when the identification code signal annexed to said control signal corresponds to the identification code allotted to said video signal generating means.

44. An apparatus according to claim 35, wherein said control signal is injected into said transmission line extended from said transmitting means to said video signal generating means, and wherein said video signal generating means further includes a control signal processing means for extracting said control signal from said transmission line for feeding the extracted control signal to a circuit corresponding to said extracted control signal, when the identification code signal annexed to said control signal corresponds to the identification code allotted to said video signal generating means.

45. An apparatus according to claim 36, wherein said control signal is injected into said transmission line extended from said transmitting means to said video signal generating means, and wherein said video signal generating means further includes a control signal processing means for extracting said control signal from said transmission line for feeding the extracted control signal to a circuit corresponding to said extracted control signal, when the identification code signal annexed to said control signal corresponds to the identification code allotted to said video signal generating means.

46. An apparatus according to claim 37, wherein said control signal is injected into said transmission line extended from said transmitting means to said video signal generating means, and wherein said video signal generating means further includes a control signal processing means for extracting said control signal from said transmission line for feeding the extracted control signal to a circuit corresponding to said extracted control signal, when the identification code signal annexed to said control signal corresponds to the identification code allotted to said video signal generating means.

47. An apparatus according to claim 38, wherein said control signal is injected into said transmission line extended from said transmitting means to said video signal generating means, and wherein said video signal generating means further includes a control signal processing means for extracting said control signal from said transmission line for feeding the extracted control signal to a circuit corresponding to said extracted control signal, when the identification code signal annexed to said control signal corresponds to the identification code allotted to said video signal generating means.

48. An apparatus according to claim 39, wherein said control signal is injected into said transmission line extended from said transmitting means to said video signal generating means, and wherein said video signal generating means further includes a control signal processing means for extracting said control signal from said transmission line for feeding the extracted control signal to a circuit corresponding to said extracted control signal, when the identification code signal annexed to said control signal corresponds to the identification code allotted to said video signal generating means.

49. An apparatus according to claim 40, wherein said control signal is injected into said transmission line extended from said transmitting means to said video signal generating means, and wherein said video signal generating means further includes a control signal processing means for extracting said control signal from said transmission line for feeding the extracted control signal to a circuit corresponding to said extracted control signal, when the identification code signal annexed to said control signal corresponds to the identification code allotted to said video signal generating means.

50. An apparatus according to claim 41, wherein said control signal is injected into said transmission line extended from said transmitting means to said video signal generating means, and wherein said video signal generating means further includes a control signal processing means for extracting said control signal from said transmission line for feeding the extracted control signal to a circuit corresponding to said extracted control signal, when the identification code signal annexed to said control signal corresponds to the identification code allotted to said video signal generating means.

51. An apparatus according to claim 42, wherein said control signal is injected into said transmission line extended from said transmitting means to said video signal generating means, and wherein said video signal generating means further includes a control signal processing means for extracting said control signal from said transmission line for feeding the extracted control signal to a circuit corresponding to said extracted control signal, when the identification code signal annexed to said control signal corresponds to the identification code allotted to said video signal generating means.

52. An apparatus according to claim 34, wherein each receiving means further includes a photo emissive element for converting said control signal together with said annexed identification code signal generated by said control means into a control light signal for feeding said control light signal to said transmitting means through said fiber optic lines, and wherein each transmitting means further includes a light receiving element for converting said control light signal carried through said fiber optic lines into an electrical control signal, for injecting said electrical controls signal into said transmission line.

53. An apparatus according to claim 35, wherein each receiving means further includes a photo emissive element for converting said control signal together with said annexed identification code signal generated by said control means into a control light signal for feeding said control light signal to said transmitting means through said fiber optic lines, and wherein each transmitting means further includes a light receiving element for converting said control light signal carried through said fiber optic lines into an electrical control signal, for injecting said electrical controls signal into said transmission line.

54. An apparatus according to claim 36, wherein each receiving means further includes a photo emissive element for converting said control signal together with said annexed identification code signal generated by said control means into a control light signal for feeding said control light signal to said transmitting means through said fiber optic lines, and wherein each transmitting means further includes a light receiving element for converting said control light signal carried through said fiber optic lines into an electrical control signal, for injecting said electrical controls signal into said transmission line.

55. An apparatus according to claim 37, wherein each receiving means further includes a photo emissive element for converting said control signal together with said annexed identification code signal generated by said control means into a control light signal for feeding said control light signal to said transmitting means through said fiber optic lines, and wherein each transmitting means further includes a light receiving element for converting said control light signal carried through said fiber optic lines into an electrical control signal, for injecting said electrical controls signal into said transmission line.

56. An apparatus according to claim 38, wherein each receiving means further includes a photo emissive element for converting said control signal together with said annexed identification code signal generated by said control means into a control light signal for feeding said control light signal to said transmitting means through said fiber optic lines, and wherein each transmitting means further includes a light receiving element for converting said control light signal carried through said fiber optic lines into an electrical control signal, for injecting said electrical controls signal into said transmission line.

57. An apparatus according to claim 39, wherein each receiving means further includes a photo emissive element for converting said control signal together with said annexed identification code signal generated by said control means into a control light signal for feeding said control light signal to said transmitting means through said fiber optic lines, and wherein each transmitting means further includes a light receiving element for converting said control light signal carried through said fiber optic lines into an electrical control signal, for injecting said electrical controls signal into said transmission line.

58. An apparatus according to claim 40, wherein each receiving means further includes a photo emissive element for converting said control signal together with said annexed identification code signal generated by said control means into a control light signal for feeding said control light signal to said transmitting means through said fiber optic lines, and wherein each transmitting means further includes a light receiving element for converting said control light signal carried through said fiber optic lines into an electrical control signal, for injecting said electrical controls signal into said transmission line.

59. An apparatus according to claim 41, wherein each receiving means further includes a photo emissive element for converting said control signal together with said annexed identification code signal generated by said control means into a control light signal for feeding said control light signal to said transmitting means through said fiber optic lines, and wherein each transmitting means further includes a light receiving element for converting said control light signal carried through said fiber optic lines into an electrical control signal, for injecting said electrical controls signal into said transmission line.

60. An apparatus according to claim 42, wherein each receiving means further includes a photo emissive element for converting said control signal together with said annexed identification code signal generated by said control means into a control light signal for feeding said control light signal to said transmitting means through said fiber optic lines, and wherein each transmitting means further includes a light receiving element for converting said control light signal carried through said fiber optic lines into an electrical control signal, for injecting said electrical controls signal into said transmission line.

61. An apparatus according to claim 52, wherein each receiving means further includes an individual control circuit for feeding said control signal to said fiber optic lines for carrying said control signal to said transmitting means.

62. An apparatus according to claim 61, wherein each transmitting means feeds said control signal to a transmission line commonly used for the video signal and the control signal, said transmission line being a line extended from said transmitting means to said video signal generating means or to a separate control transmission line.

63. An apparatus according to claim 53, wherein each receiving means further includes an individual control circuit for feeding said control signal to said fiber optic lines for carrying said control signal to said transmitting means.

64. An apparatus according to claim 63, wherein each transmitting means feeds said control signal to a transmission line commonly used for the video signal and the control signal, said transmission line being a line extended from said transmitting means to said video signal generating means or to a separate control transmission line.

65. An apparatus according to claim 54, wherein each receiving means further includes an individual control circuit for feeding said control signal to said fiber optic lines for carrying said control signal to said transmitting means.

66. An apparatus according to claim 65, wherein each transmitting means feeds said control signal to a transmission line commonly used for the video signal and the control signal, said transmission line being a line extended from said transmitting means to said video signal generating means or to a separate control transmission line.

67. An apparatus according to claim 55, wherein each receiving means further includes an individual control circuit for feeding said control signal to said fiber optic lines for carrying said control signal to said transmitting means.

68. An apparatus according to claim 67, wherein each transmitting means feeds said control signal to a transmission line commonly used for the video signal and the control signal, said transmission line being a line extended from said transmitting means to said video signal generating means or to a separate control transmission line.

69. An apparatus according to claim 56, wherein each receiving means further includes an individual control circuit for feeding said control signal to said fiber optic lines for carrying said control signal to said transmitting means.

70. An apparatus according to claim 69, wherein each transmitting means feeds said control signal to a transmission line commonly used for the video signal and the control signal, said transmission line being a line extended from said transmitting means to said video signal generating means or to a separate control transmission line.

71. An apparatus according to claim 57, wherein each receiving means further includes an individual control circuit for feeding said control signal to said fiber optic lines for carrying said control signal to said transmitting means.

72. An apparatus according to claim 71, wherein each transmitting means feeds said control signal to a transmission line commonly used for the video signal and the control signal, said transmission line being a line extended from said transmitting means to said video signal generating means or to a separate control transmission line.

73. An apparatus according to claim 58, wherein each receiving means further includes an individual control circuit for feeding said control signal to said fiber optic lines for carrying said control signal to said transmitting means.

74. An apparatus according to claim 73, wherein each transmitting means feeds said control signal to a transmission line commonly used for the video signal and the control signal, said transmission line being a line extended from said transmitting means to said video signal generating means or to a separate control transmission line.

75. An apparatus according to claim 59, wherein each receiving means further includes an individual control circuit for feeding said control signal to said fiber optic lines for carrying said control signal to said transmitting means.

76. An apparatus according to claim 75, wherein each transmitting means feeds said control signal to a transmission line commonly used for the video signal and the control signal, said transmission line being a line extended from said transmitting means to said video signal generating means or to a separate control transmission line.

77. An apparatus according to claim 60, wherein each receiving means further includes an individual control circuit for feeding said control signal to said fiber optic lines for carrying said control signal to said transmitting means.

78. An apparatus according to claim 77, wherein each transmitting means feeds said control signal to a transmission line commonly used for the video signal and the control signal, said transmission line being a line extended from said transmitting means to said video signal generating means or to a separate control transmission line.

79. An apparatus according to claim 61, further comprising:
   a master control unit for supervising the state controlled by said control circuit in order to prevent any conflicting control commands or prohibited commands.

80. An apparatus according to claim 63, further comprising:
a master control unit for supervising the state controlled by said control circuit in order to prevent any conflicting control commands or prohibited commands.

81. An apparatus according to claim 65, further comprising:
a master control unit for supervising the state controlled by said control circuit in order to prevent any conflicting control commands or prohibited commands.

82. An apparatus according to claim 67, further comprising:
a master control unit for supervising the state controlled by said control circuit in order to prevent any conflicting control commands or prohibited commands.

83. An apparatus according to claim 69, further comprising:
a master control unit for supervising the state controlled by said control circuit in order to prevent any conflicting control commands or prohibited commands.

84. An apparatus according to claim 71, further comprising:
a master control unit for supervising the state controlled by said control circuit in order to prevent any conflicting control commands or prohibited commands.

85. An apparatus according to claim 73, further comprising:
a master control unit for supervising the state controlled by said control circuit in order to prevent any conflicting control commands or prohibited commands.

86. An apparatus according to claim 75, further comprising:
a master control unit for supervising the state controlled by said control circuit in order to prevent any conflicting control commands or prohibited commands.

87. An apparatus according to claim 77, further comprising:
a master control unit for supervising the state controlled by said control circuit in order to prevent any conflicting control commands or prohibited commands.

88. An apparatus according to claim 7, wherein said selection means is respectively arranged for each receiving means for individually controlling said light passing areas of said liquid crystal panel, and wherein said selection means is synchronized by said external synchronizing signal to time the selection of any of said plurality of light passing areas during the vertical blanking period.

89. An apparatus according to claim 8, wherein said selection means is respectively arranged for each receiving means for individually controlling said light passing areas of said liquid crystal panel, and wherein said selection means is synchronized by said external synchronizing signal to time the selection of any of said plurality of light passing areas during the vertical blanking period.

90. An apparatus according to claim 9, wherein said selection means is respectively arranged for each receiving means for individually controlling said light passing areas of said liquid crystal panel, and wherein said selection means is synchronized by said external synchronizing signal to time the selection of any of said plurality of light passing areas during the vertical blanking period.

91. An apparatus according to claim 10, wherein said selection means is respectively arranged for each receiving means for individually controlling said light passing areas of said liquid crystal panel, and wherein said selection means is synchronized by said external synchronizing signal to time the selection of any of said plurality of light passing areas during the vertical blanking period.

92. An apparatus according to claim 11, wherein said selection means is respectively arranged for each receiving means for individually controlling said light passing areas of said liquid crystal panel, and wherein said selection means is synchronized by said external synchronizing signal to time the selection of any of said plurality of light passing areas during the vertical blanking period.

93. An apparatus according to claim 9, wherein said selection means is respectively arranged for each receiving means for individually controlling said light passing areas of said liquid crystal panel, and wherein said selection means is synchronized by said external synchronizing signal to time the selection of any of said plurality of light passing areas during the vertical blanking period.

94. An apparatus according to claim 88 further comprising:
a master selection circuit for supervising the state of selection by said selection means.

95. An apparatus according to claim 89 further comprising:
a master selection circuit for supervising the state of selection by said selection means.

96. An apparatus according to claim 90 further comprising:
a master selection circuit for supervising the state of selection by said selection means.

97. An apparatus according to claim 91 further comprising:
a master selection circuit for supervising the state of selection by said selection means.

98. An apparatus according to claim 92 further comprising:
a master selection circuit for supervising the state of selection by said selection means.

99. An apparatus according to claim 93 further comprising:
a master selection circuit for supervising the state of selection by said selection means.

100. Apparatus as claimed in claim 16, wherein said identification code signal generation circuit is included in said transmitting means instead of being included in said video signal generating means.

101. Apparatus as claimed in claim 17, wherein said identification code signal generation circuit is included in said transmitting means instead of being included in said video signal generating means.

102. Apparatus as claimed in claim 18, wherein said identification code signal generation circuit is included in said transmitting means instead of being included in said video signal generating means.

103. Apparatus as claimed in claim 19, wherein said identification code signal generation circuit is included in said transmitting means instead of being included in said video signal generating means.

104. Apparatus as claimed in claim 20, wherein said identification code signal generation circuit is included in said transmitting means instead of being included in said video signal generating means.

105. Apparatus as claimed in claim 21, wherein said identification code signal generation circuit is included in said transmitting means instead of being included in said video signal generating means.

106. Apparatus as claimed in claim 22, wherein said identification code signal generation circuit is included in said transmitting means instead of being Included In said video signal generating means.

107. Apparatus as claimed in claim 23, wherein said identification code signal generation circuit is included in said transmitting means instead of being included in said video signal generating means.

108. Apparatus as claimed in claim 24, wherein said identification code signal generation circuit is included in said transmitting means instead of being included in said video signal generating means.

109. An apparatus according to claim 4, wherein each video signal generating means further includes a signal mixing means for generating a mixed signal composed of a video signal and an audio signal by injecting the audio signal into said video signal, and for feeding said mixed signal to said transmission line.

110. An apparatus according to claim 109, wherein each receiving means further includes an audio signal retrieving means for outputting the audio signal by retrieving said audio signal from said electrical output signal.

111. An apparatus according to claim 5, wherein each transmitting means further includes a signal mixing means for generating a mixed signal composed of a video signal and an audio signal by injecting the audio signal into said video signal and for feeding said mixed signal to said driver.

112. An apparatus according to claim 5, wherein each video signal generating means further includes a signal mixing means for generating a mixed signal composed of a video signal and an audio signal by injecting the audio signal into said video signal, and for feeding said mixed signal to said transmission line.

113. An apparatus according to claim 111, wherein each receiving means further includes an audio signal retrieving means for outputting the audio signal by retrieving said audio signal from said electrical output signal.

114. An apparatus according to claim 112, wherein each receiving means further includes an audio signal retrieving means for outputting the audio signal by retrieving said audio signal from said electrical output signal.

115. An apparatus according to claim 6, wherein each transmitting means further includes a signal mixing means for generating a mixed signal composed of a video signal and an audio signal by injecting the audio signal into said video signal and for feeding said mixed signal to said driver.

116. An apparatus according to claim 6, wherein each video signal generating means further includes a signal mixing means for generating a mixed signal composed of a video signal and an audio signal by injecting the audio signal into said video signal, and for feeding said mixed signal to said transmission line.

117. An apparatus according to claim 115, wherein each receiving means further includes an audio signal retrieving means for outputting the audio signal by retrieving said audio signal from said electrical output signal.

118. An apparatus according to claim 116, wherein each receiving means further includes an audio signal retrieving means for outputting the audio signal by retrieving said audio signal from said electrical output signal.

\* \* \* \* \*